United States Patent
Gharabally et al.

(10) Patent No.: US 10,255,580 B2
(45) Date of Patent: Apr. 9, 2019

(54) NETWORK-BASED DISTRIBUTION OF APPLICATION PRODUCTS

(75) Inventors: Sam Gharabally, San Francisco, CA (US); Yoon Sub Hwang, Alameda, CA (US); Mark Miller, San Francisco, CA (US); Andrew Wadycki, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 1174 days.

(21) Appl. No.: 12/286,075

(22) Filed: Sep. 26, 2008

(65) Prior Publication Data

US 2009/0276332 A1 Nov. 5, 2009

Related U.S. Application Data

(60) Provisional application No. 61/059,790, filed on Jun. 8, 2008, provisional application No. 61/050,478, filed on May 5, 2008.

(51) Int. Cl.
*G06Q 30/00* (2012.01)
*G06Q 10/08* (2012.01)
(Continued)

(52) U.S. Cl.
CPC ............ *G06Q 10/087* (2013.01); *G06F 8/60* (2013.01); *G06Q 30/06* (2013.01); *G06Q 30/0601* (2013.01)

(58) Field of Classification Search
CPC .. G06Q 30/00; G06Q 30/0643; G06Q 10/087; G06Q 30/06; G06Q 30/0601; G06F 8/60
(Continued)

(56) References Cited

U.S. PATENT DOCUMENTS

| 4,750,119 A | 6/1988 | Cohen et al. |
| 5,253,165 A | 10/1993 | Leiseca et al. |

(Continued)

FOREIGN PATENT DOCUMENTS

| EP | 1 684 223 A1 | 7/2006 |
| EP | 2 230 620 A1 | 9/2010 |

(Continued)

OTHER PUBLICATIONS

Lei-da Chen et al. "Enticing online consumers: an extended technology acceptance perspective", Information & Management 39 (2002) 705-719.*

(Continued)

*Primary Examiner* — Naeem U Haq
(74) *Attorney, Agent, or Firm* — Dickinson Wright RLLP

(57) ABSTRACT

An improved system and method for submitting, distributing and/or managing digital products with respect to a product distribution system are disclosed. The submission of digital products to the product distribution system can operate to electronically submit not only the digital products but also product information, developer information and distribution parameters. The product distribution system can present the digital products for distribution at an online product distribution site in accordance with the distribution parameters. The online product distribution site can present potential purchasers with product information and/or developer information prior to any purchase.

21 Claims, 27 Drawing Sheets
(16 of 27 Drawing Sheet(s) Filed in Color)

(51) Int. Cl.
*G06F 8/60* (2018.01)
*G06Q 30/06* (2012.01)

(58) Field of Classification Search
USPC ..... 705/26.1, 26.2, 26.25, 26.3, 26.35, 26.4,
705/26.41–26.44, 26.5, 26.61–26.64, 26.7,
705/26.8, 26.81, 26.82, 26.9, 27.1, 27.2
See application file for complete search history.

(56) References Cited

U.S. PATENT DOCUMENTS

| | | |
|---|---|---|
| 5,535,383 A | 7/1996 | Gower |
| 5,627,973 A | 5/1997 | Armstrong et al. |
| 5,752,128 A | 5/1998 | Yamashita |
| 5,884,280 A | 3/1999 | Yoshioka et al. |
| 6,067,531 A | 5/2000 | Hoyt et al. |
| 6,085,253 A | 7/2000 | Blackwell et al. |
| 6,151,643 A | 11/2000 | Cheng |
| 6,226,618 B1 | 5/2001 | Downs et al. |
| 6,233,682 B1* | 5/2001 | Fritsch ............ 713/168 |
| 6,236,313 B1 | 5/2001 | Eskildsen et al. |
| 6,275,954 B1 | 8/2001 | Herman et al. |
| 6,338,044 B1 | 1/2002 | Cook et al. |
| 6,341,353 B1 | 1/2002 | Herman et al. |
| 6,345,256 B1 | 2/2002 | Milsted et al. |
| 6,363,486 B1 | 3/2002 | Knapton |
| 6,385,596 B1* | 5/2002 | Wiser et al. ........ 705/51 |
| 6,546,555 B1 | 4/2003 | Hjelsvold et al. |
| 6,549,922 B1 | 4/2003 | Srivastava et al. |
| 6,587,837 B1 | 7/2003 | Spagna et al. |
| 6,658,476 B1 | 12/2003 | Van |
| 6,691,149 B1 | 2/2004 | Yokota et al. |
| 6,731,312 B2 | 5/2004 | Robbin |
| 6,754,895 B1 | 6/2004 | Bartel et al. |
| 6,873,992 B1 | 3/2005 | Thomas |
| 6,874,003 B2 | 3/2005 | Morohashi |
| 6,910,049 B2 | 6/2005 | Fenton et al. |
| 6,938,005 B2 | 8/2005 | Iverson et al. |
| 7,073,193 B2 | 7/2006 | Marsh |
| 7,076,445 B1 | 7/2006 | Cartwright |
| 7,168,012 B2 | 1/2007 | Clauss et al. |
| 7,209,892 B1 | 4/2007 | Galuten et al. |
| 7,275,243 B2 | 9/2007 | Gibbons et al. |
| 7,308,413 B1 | 12/2007 | Tota et al. |
| 7,383,233 B1 | 6/2008 | Singh et al. |
| 7,624,046 B2 | 11/2009 | Galuten et al. |
| 7,685,512 B2 | 3/2010 | Hanson et al. |
| 7,729,946 B2 | 6/2010 | Chu |
| 7,756,920 B2 | 7/2010 | Muller et al. |
| 7,827,162 B2 | 11/2010 | Suitts et al. |
| 7,844,548 B2 | 11/2010 | Robbin et al. |
| 7,860,830 B2* | 12/2010 | Mirrashidi et al. ......... 707/626 |
| 7,962,634 B2 | 6/2011 | Cortes et al. |
| 9,021,020 B1* | 4/2015 | Ramaswamy ...... G06Q 30/06 709/203 |
| 9,092,302 B2* | 7/2015 | Oberheide ....... G06F 17/30477 |
| 9,152,407 B2* | 10/2015 | Zuverink ............ G06F 8/65 |
| 2001/0037207 A1 | 11/2001 | Dejaeger |
| 2001/0054046 A1 | 12/2001 | Mikhailov et al. |
| 2002/0078211 A1 | 6/2002 | Natarajan et al. |
| 2002/0082857 A1 | 6/2002 | Skordin et al. |
| 2002/0087440 A1 | 7/2002 | Blair et al. |
| 2002/0143782 A1 | 10/2002 | Headings et al. |
| 2003/0037242 A1 | 2/2003 | Yasuna et al. |
| 2003/0149970 A1* | 8/2003 | Shanbhogue ....... G06F 8/656 717/170 |
| 2003/0182188 A1* | 9/2003 | Duchow .............. 705/14 |
| 2004/0139232 A1* | 7/2004 | Giannetti ........ G06F 17/3089 709/246 |
| 2004/0267608 A1 | 12/2004 | Mansfield, Jr. |
| 2005/0144635 A1 | 6/2005 | Boortz |
| 2005/0235048 A1* | 10/2005 | Costa-Requena ........... H04L 29/06027 709/219 |
| 2005/0240529 A1 | 10/2005 | Thomas |
| 2005/0267894 A1 | 12/2005 | Carnahan |
| 2005/0278375 A1 | 12/2005 | Mitchko et al. |
| 2005/0283394 A1 | 12/2005 | McGloin et al. |
| 2006/0008256 A1 | 1/2006 | Khedouri et al. |
| 2006/0015489 A1 | 1/2006 | Probst et al. |
| 2006/0041748 A1 | 2/2006 | Lockhart et al. |
| 2006/0048132 A1 | 3/2006 | Chen et al. |
| 2006/0074754 A1 | 4/2006 | Toyohara et al. |
| 2006/0107046 A1* | 5/2006 | Raley et al. .............. 713/168 |
| 2006/0112101 A1 | 5/2006 | Young |
| 2006/0161604 A1 | 7/2006 | Lobo |
| 2006/0167751 A1 | 7/2006 | Maruyama |
| 2006/0212722 A1 | 9/2006 | Ginter et al. |
| 2006/0277096 A1 | 12/2006 | Levitus |
| 2006/0287966 A1 | 12/2006 | Srinivasaraghavan et al. |
| 2007/0011156 A1 | 1/2007 | Maron |
| 2007/0011178 A1 | 1/2007 | Dumitru et al. |
| 2007/0028269 A1* | 2/2007 | Nezu et al. ................ 725/52 |
| 2007/0073694 A1 | 3/2007 | Picault et al. |
| 2007/0083471 A1 | 4/2007 | Robbin et al. |
| 2007/0106522 A1 | 5/2007 | Collins |
| 2007/0108274 A1 | 5/2007 | Boardman et al. |
| 2007/0192352 A1 | 8/2007 | Levy |
| 2007/0208718 A1* | 9/2007 | Javid et al. .............. 707/3 |
| 2007/0220051 A1 | 9/2007 | Brentano et al. |
| 2007/0261088 A1 | 11/2007 | Phillips et al. |
| 2007/0265969 A1 | 11/2007 | Horwat et al. |
| 2007/0266028 A1 | 11/2007 | Muller et al. |
| 2007/0266047 A1 | 11/2007 | Cortes et al. |
| 2008/0040379 A1 | 2/2008 | Suitts et al. |
| 2008/0140493 A1 | 6/2008 | DeAngelis |
| 2008/0147558 A1* | 6/2008 | Kraus ................ 705/59 |
| 2008/0155552 A1 | 6/2008 | Kim |
| 2008/0195651 A1 | 8/2008 | Rachmiel et al. |
| 2008/0288405 A1 | 11/2008 | John |
| 2009/0063543 A1 | 3/2009 | Martin et al. |
| 2009/0138117 A1 | 5/2009 | Bagwell et al. |
| 2009/0164564 A1* | 6/2009 | Willis ........... G06F 17/30017 709/203 |
| 2009/0198830 A1 | 8/2009 | Zhang et al. |
| 2009/0259502 A1 | 10/2009 | Erlewine et al. |
| 2009/0260060 A1 | 10/2009 | Smith et al. |
| 2009/0276333 A1 | 11/2009 | Cortes et al. |
| 2009/0276433 A1 | 11/2009 | Fosback et al. |
| 2009/0307201 A1 | 12/2009 | Dunning et al. |
| 2009/0307682 A1 | 12/2009 | Gharabally |
| 2009/0307683 A1 | 12/2009 | Gharabally |
| 2009/0319356 A1* | 12/2009 | Spitzer ........... G06Q 20/1235 705/14.25 |
| 2010/0060776 A1 | 3/2010 | Topliss et al. |
| 2010/0115443 A1 | 5/2010 | Richstein |
| 2010/0205274 A1 | 8/2010 | Gharabally et al. |
| 2010/0235254 A1 | 9/2010 | Chu et al. |
| 2010/0235889 A1 | 9/2010 | Chu et al. |
| 2010/0251099 A1 | 9/2010 | Makower et al. |
| 2010/0299219 A1 | 11/2010 | Cortes et al. |
| 2011/0023001 A1 | 1/2011 | Giffel |
| 2015/0046832 A1* | 2/2015 | George ........... G06F 17/3089 715/744 |

FOREIGN PATENT DOCUMENTS

| | | |
|---|---|---|
| WO | WO 97/04410 | 2/1997 |
| WO | WO 98/49644 | 11/1998 |
| WO | WO 00/08909 | 2/2000 |
| WO | WO 02/48920 | 6/2002 |
| WO | WO 2004/019182 A2 | 3/2004 |

OTHER PUBLICATIONS

Joshua Stern, Ph.D "Web Basics Workshop" Copyright 1996-2005. Retrieved from www.wlac.edu/online/documents/webbasics.pdf (Year: 2005).*

"Liquifier Pro 4.0 for Windows™ User's Guide," 1998, Liquid Audio, Inc.

(56) References Cited

OTHER PUBLICATIONS

Radified Guide to Ripping & Encoding CD Audio, http://mp3.radified.com, downloaded Oct. 7, 2003, pp. 1-5.
"Music Collector Features," Collectorz.com music collector features, http://www.collectorz.com/music/features.php, downloaded Oct. 7, 2003, pp. 1-2.
"Gracenote CDDB," Gracenote, product webpage, http://www.gracenote.com/gn_products/cddb.html, downloaded Oct. 7, 2003, pp. 1-2.
"Gracenote MusicID," Gracenote, product webpage, http://www.gracenote.com/gn_products/music_id.html, downloaded Oct. 7, 2003, pp. 1-2.
"AVCataloger Overview," NC Software, Inc. http://www.avcataloger.com/Products.aspx, downloaded Oct. 6, 2003, pp. 1-4.
Jyri Huopaniemi, "Music Encoding and Transmission," CUIDAD meeting, ICMC '2000 Berlin, Aug. 28, 2000.
"Media Encoding FAQ," Loudeye Corp., http://www.loudeye.com/digitalmedia/solutions/mediaenchost/encodingfaq.asp, downloaded Oct. 9, 2003, pp. 1-3.
"Media encoding datasheet," Loudeye Corp., http://www.loudeye.com/digitalmedia/solutions/mediaenchost/encoding.asp, downloaded Oct. 9, 2003, pp. 1-4.
"Media hosting datasheet," Loudeye Corp. http://www.loudeye.com/digitalmedia/solutions/mediaenchost/hosting.asp, downloaded Oct. 9, 2003, pp. 1-2.
"Preview and Convera Announce Availability of Digital Media Commerce Platform for Secure Digital Audio Devices," Convera Press release, Las Vegas, NV, Consumer Electronics Show, Jan. 8, 2001, pp. 1-3.
Sonopress Global Network User Manual, Client Tools, Upload Data/Graphics Files to Sonopress, Sonopress, date unknown.
MPEG-7 Multimedia Description Schemes XM (Version 2.0), ISO/IEC, Mar. 2000, pp. 1-138.
U.S. Appl. No. 11/786,031, entitled "Media Package Format for Submission to a Media Distribution System", filed Apr. 9, 2007.
U.S. Appl. No. 11/946,711, entitled "Resubmission of Media for Network-Based Distribution", filed Nov. 28, 2007.
"Digital Audio Best Practices Version 2.1", by Digital Audio Working Group, Oct. 2006, http:/www.mndigital.org.digitizing/standards/audio.pdf.

* cited by examiner

NETWORK-BASED DISTRIBUTION OF APPLICATION PRODUCTS

CROSS-REFERENCE TO OTHER APPLICATIONS

This application claims priority to: (i) U.S. Provisional Patent Application No. 61/059,790, filed Jun. 8, 2008, entitled "NETWORK-BASED DISTRIBUTION OF APPLICATION PRODUCTS", which is hereby incorporated herein by reference; and (ii) U.S. Provisional Patent Application No. 61/050,478, filed May 5, 2008, entitled "ELECTRONIC SUBMISSION AND MANAGEMENT OF DIGITAL PRODUCTS FOR NETWORK-BASED DISTRIBUTION", which is hereby incorporated herein by reference.

This application also references and/or incorporates: (i) U.S. Provisional Patent Application No. 61/059,792, filed Jun. 8, 2008, entitled "ELECTRONIC SUBMISSION OF APPLICATION PROGRAMS FOR NETWORK-BASED DISTRIBUTION", which is hereby incorporated herein by reference; and (ii) U.S. Provisional Patent Application No. 61/059,791, filed Jun. 8, 2008, entitled "NETWORK-BASED UPGRADE OF APPLICATION PROGRAMS", which is hereby incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure as it appears in the U.S. Patent and Trademark Office patent file or records, but otherwise reserves all copyright rights whatsoever.

BACKGROUND OF THE INVENTION

Field of the Invention

The present invention relates to distribution of digital products and, more particularly, to network-based distribution of digital products.

Description of the Related Art

Today, online media stores, such as iTunes™ Media Store, allow customers (i.e., online users) to purchase or rent media items, such as music or videos, over the Internet. Often, at online media stores, numerous media items made available and are provided by various different content providers, such as music labels or movie companies. Software tools, such as iProducer™ and Label Connect™ available from Apple Inc. of Cupertino, Calif., can assist content providers with online submission of media content to the iTunes™ Media Store.

Software programs are also available to purchased or licensed at retail stores as well as online stores. Conventionally, a software program is primarily purchased as a compact disc (CD) containing the software program. Alternatively, purchasers can often purchase and download a software program from an online retailer or a software provider's website. However, when an online retailer operates to sell software programs of various independent parties, there are difficulties in providing the digital program files and supporting information/files to the online retailers. This problem is exacerbated by a large number of small software providers that often desire to partner with the online retailer. As a result, online retailers that receive online submissions face substantial burdens and difficulties due to the wide range of variation with respect to the submissions.

Therefore, there is a need for improved approaches to facilitate distribution of software programs to online retailers.

SUMMARY OF THE INVENTION

The invention relates to an improved system and method for submitting, distributing and/or managing digital products with respect to a product distribution site. The submission of digital products to the product distribution site is able to be performed by numerous submitters in a uniform and computer-assisted manner. The submitted digital products can then be managed in a largely automated manner and made available for online purchase and distribution at the product distribution site. Once a digital product is submitted, the user can access the status of the digital product submission to obtain information of whether the digital product has been approved or rejected. After digital products are approved, the digital products are made available at the product distribution site such that user can search, browse and purchase any of the digital products. In one embodiment, the digital products are computer program products (e.g., computer software programs). The product distribution site can also be referred to as an online product hosting site.

According to one embodiment, an online distribution system for digital products, namely computer program products, can receive electronic submission of not only computer program products but also product information, developer information and distribution parameters. The product distribution system can then present the computer program products for distribution at an online product distribution site in accordance with the distribution parameters. The online product distribution site also can present potential purchases with product information and/or developer information prior to any purchase.

Product information and/or developer information can be used to generate windows (or webpages) for presentation of such information. In one embodiment, these windows can be automatically generated from the electronic submission of the product information and/or the developer information. Further, these windows can have a consistent pattern that facilitates usage by users that often search and browse through many different available computer program products.

The invention can be implemented in numerous ways, including as a method, system, device, apparatus (including computer readable medium and graphical user interface). Several embodiments of the invention are discussed below.

As a method for locating information on a digital product that is made available for distribution at an online repository, one embodiment of the invention includes at least: receiving an electronic submission of product information and distribution information pertaining to the digital product; rendering the digital product available for distribution from an online store in accordance with the distribution information; and assisting a user to the online store in locating at least a portion of the product information pertaining to the digital product.

As a computer-implemented method for accessing information concerning application products from an online repository, one embodiment of the invention can, for example, include at least: presenting an electronic information page providing descriptive information on a plurality of different application programs, the electronic information page including, for each of the different application programs, at least descriptive information, a first user interface control to access developer information and a second user interface control to access application information; presenting a developer information page in response to selection of the first user interface control of the electronic information page, the developer information page including at least text data pertaining to the particular developer; and presenting an application information page in response to selection of the second user interface control of the electronic information page, the application information page including at least text and graphic data pertaining to the particular application program.

As a graphical user interface for locating and downloading a digital product from an online distribution site, one embodiment of the invention can, for example, include at least: a main window configured to promote a plurality of digital products and to enable a user to search or browse the digital products or access information about the digital products; a search dialog or window configured to assist the user in searching the digital products; and a main application window configured to promote a plurality of digital computer program products. The main window can be replaced by the main application window when the user initiates presentation of the main application window Other aspects and advantages of the invention will become apparent from the following detailed description taken in conjunction with the accompanying drawings which illustrate, by way of example, the principles of the invention.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

The invention will be readily understood by the following detailed description in conjunction with the accompanying drawings, wherein like reference numerals designate like elements, and in which.

DETAILED DESCRIPTION OF THE INVENTION

The invention relates to an improved system and method for submitting, distributing and/or managing digital products with respect to a product distribution site. The submission of digital products to the product distribution site is able to be performed by numerous submitters in a uniform and computer-assisted manner. The submitted digital products can then be managed in a largely automated manner and made available for online purchase and distribution at the product distribution site. Once a digital product is submitted, the user can access the status of the digital product submission to obtain information of whether the digital product has been approved or rejected. After digital products are approved, the digital products are made available at the product distribution site such that user can search, browse and purchase any of the digital products. In one embodiment, the digital products are computer program products (e.g., computer software programs). The product distribution site can also be referred to as an online product hosting site.

According to one embodiment, an online distribution system for digital products, namely computer program products, can receive electronic submission of not only computer program products but also product information, developer information and distribution parameters. The product distribution system can then present the computer program products for distribution at an online product distribution site in accordance with the distribution parameters. The online product distribution site also can present potential purchases with product information and/or developer information prior to any purchase.

Product information and/or developer information can be used to generate windows (or webpages) for presentation of such information. In one embodiment, these windows can be automatically generated from the electronic submission of the product information and/or the developer information. Further, these windows can have a consistent pattern that facilitates usage by users that often search and browse through many different available computer program products.

Embodiments of various aspects of the invention are discussed below with reference to FIGS. 1-26. However, those skilled in the art will readily appreciate that the detailed description given herein with respect to these figures is for explanatory purposes as the invention extends beyond these limited embodiments.

Figure 1:
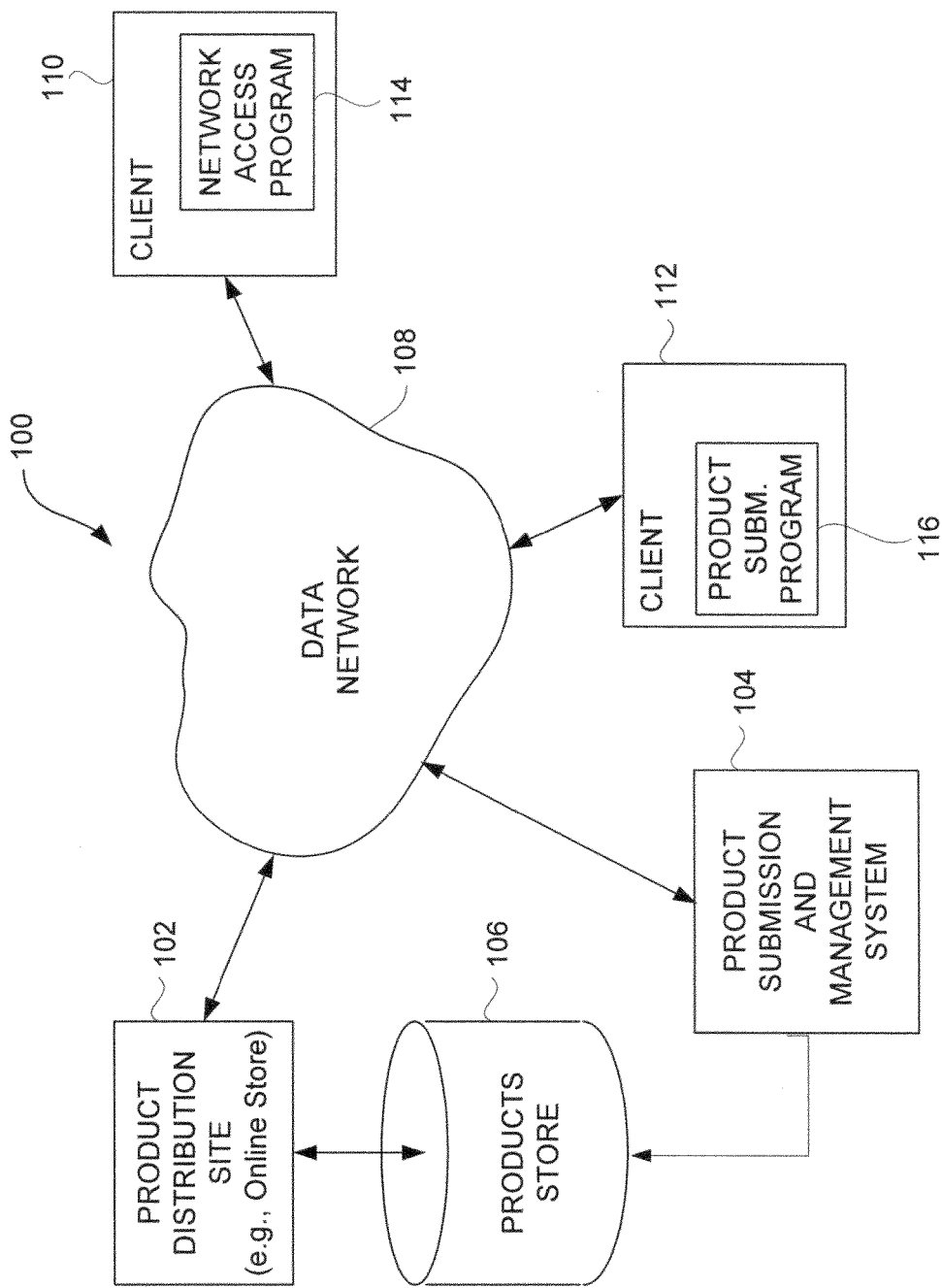
FIG. 1 is a block diagram of a product submission and distribution system according to one embodiment of the invention.

FIG. 1 is a block diagram of a product submission and distribution system 100 according to one embodiment of the invention. The product submission and distribution system 100 includes a product distribution site 102. The product distribution site 102 provides an online access point for distribution of various digital products. For example, the product distribution site 102 can be referred to as an online store. A product submission and management system 104 operates to receive submissions of digital products from various digital product submitters. The product submission and management system 104 can process submission of digital products and authorize distribution of approved digital products. The digital products can be stored in a products store 106. In one embodiment, the products store 106 includes a mass data store and one or more databases. The products store 106 provides mass storage of the numerous digital products that are available for distribution (e.g., purchase or rental). For example, digital products that have been purchased can be accessed from the products store 106 over a data network 108 by way of the product distribution site 102. Examples of digital products are computer program products such as applications (or application programs), animations, or presentations.

The product submission and distribution system 100 also includes a first client 110 and a second client 112. Typically, the product submission and distribution system 100 would include a plurality of different clients 110, 112. The first client 110 includes a network access program 114. The second client 112 includes a product submission program 116. Some clients can also include both the network access program 114 and the product submission program 116. The network access program 114 is an application program (e.g., software application) that operates on the first client 110, which is a computing device. One example of a suitable network access program is a network browser (e.g., Microsoft Explorer or Safari). Another example of a suitable network access program is iTunes™ offered by Apple Inc. The first client 110 is coupled to the product distribution site 102 through the data network 108. Hence, any of the first clients 110 can interact with the product distribution site 102 to review, purchase and/or manage digital products.

The product submission program 116 is also an application program (e.g., software application) that operates on the second client 112, which is a computing device. The product submission program 116 is used to submit digital products to the product submission and management system 104 for eventual distribution by the media distribution site 102. Although the network access program 114 and the product submission program 116 are shown in FIG. 1 as separate programs, it should be understood that such programs can be integrated into a single program or reside on the same client machine.

In the product submission and distribution system 100 shown in FIG. 1, the digital products are submitted to the product submission and management system 104 by way of the product submission program 116. The digital products that have been submitted (e.g., via the second client 112 are processed and then stored in the products store 106. Thereafter, the stored digital products are available to be purchased from the product distribution site 102. Upon purchasing a particular digital product, the product distribution site 102 permits the digital data for the particular digital product to be retrieved from the products store 106 and then delivered (e.g., downloaded) from the product distribution site 102 to the requesting client 110 through the data network 108. In this regard, the product distribution site 102 or some other delivery server (not shown) obtains the digital data corresponding to the particular digital product from the products store 106 and downloads such digital data through the data network 108 to the client 110. The downloaded digital data can then be stored on the client 110. In one embodiment, the downloaded digital data is encrypted as received at the client 110 but is decrypted and then perhaps re-encrypted before persistently stored on the client 110. Thereafter, the client 110 can utilize (e.g., execute) the digital data of the digital product at the client 110.

The product submission and distribution system 100 allows a user of the client 110 to utilize the network access program 114 to browse, search or sort through a plurality of digital products that can be purchased from the product distribution site 102. The network access program 114 may also allow the user to preview or demo some or all of a digital product. In the event that the user of the network access program 114 desires to purchase a particular digital product, the user (via the network access program 114) and the product distribution site 102 can engage in an online commerce transaction in which the user pays for access rights to the particular digital product. In one embodiment, a credit card associated with the user is credited for a purchase or rental amount of the particular digital product.

The submission and purchase of the digital products can be achieved over the data network 108. In other words, the submission and purchase of the digital products can be achieved online. The purchase of media items online can also be referred to as electronic commerce (e-commerce). In one embodiment, the data network 108 makes use of at least a portion of the Internet. The clients 110, 112 can vary with application but generally are computing devices that have memory storage. Often, the clients 110, 112 are personal computers or other computing devices that are capable of storing and presenting media to their users. In one embodiment, the connections through the data network 108 between the product distribution site 102 and the clients 110, 112 can be through secure connections, such as Secure Sockets Layer (SSL).

Although the product distribution site 102, the product submission and management system 104 and the products store 106 are shown in FIG. 1 as being separate components, it should be understood that any of these components can be combined into one or more apparatus. For example, the product submission and management system 104 can be incorporated into the product distribution site 102. As another example, the products store 106 can be incorporated into the product distribution site 102 or the product submission and management system 104.

Figure 2:
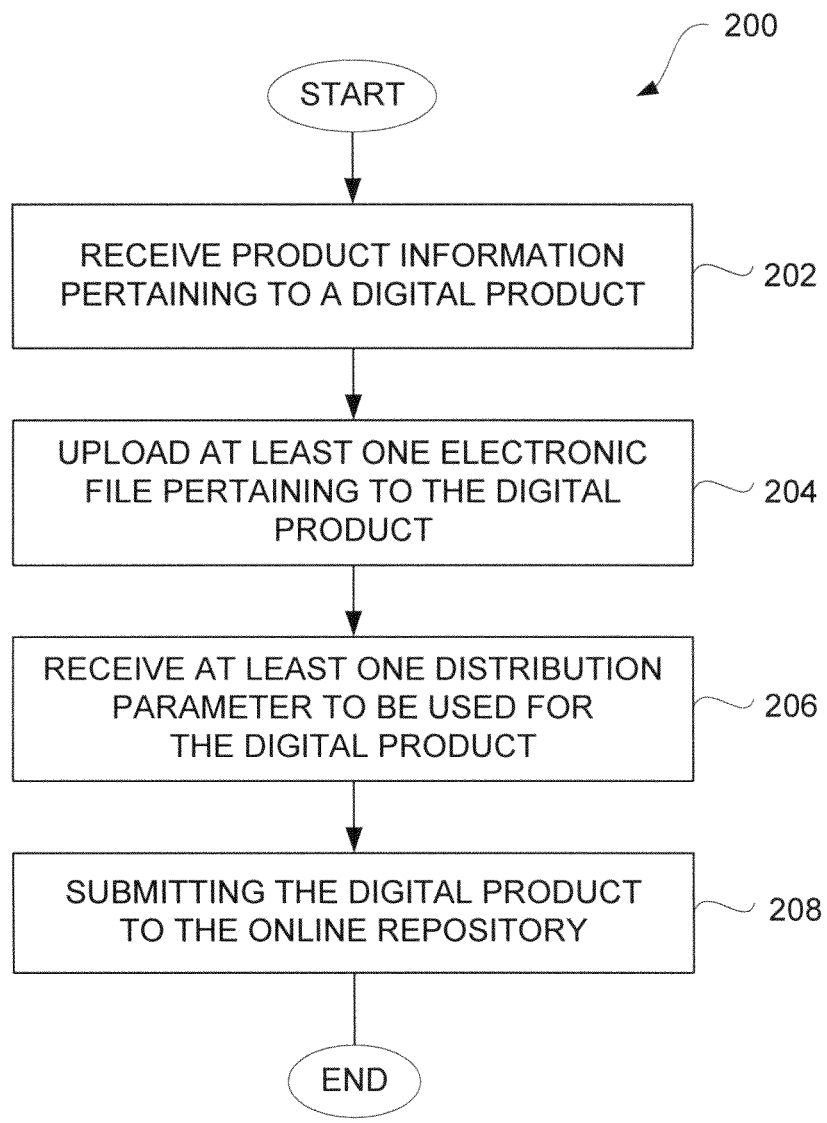
FIG. 2 is a flow diagram of a digital product submission process according to one embodiment of the invention.

FIG. 2 is a flow diagram of a digital product submission process 200 according to one embodiment of the invention. The digital product submission process 200 can, for example, be performed by a client device, such as the client 114, or a server device, such as the product submission and management system 104.

The digital product submission process 200 can receive 202 product information pertaining to a digital product. The product information can vary depending upon the type of digital product being submitted. In one implementation, one type of digital product that can be submitted to an online repository by the digital product submission process 200 is a digital program product, such as a computer program product. Examples of product information for a computer program product can include one or more of: a product name, a supported device type indication, genre indication, version number, product identifier, support information, and license agreement information.

Next, a least one electronic file pertaining to a digital product can be uploaded 204. The digital product can have one or more electronic files associated therewith. For example, the digital product may include a binary file, a support or help file, and/or one more exemplary screen illustrations.

In addition, a least one distribution parameter to be used with the digital product can be received 206. A distribution parameter is a parameter that can be utilized to control or influence the manner in which the digital product is able to be distributed. One example of a distribution parameter is a pricing parameter. As an example, a pricing parameter can specify a price or a price tier to be associated with the digital product. Other distribution parameters can pertain to digital storefronts from which the digital product is to be distributed from. Still further, distribution parameters could also pertain to preview eligibility, license categories (types), etc.

Thereafter, the digital product can be submitted 208 to the online repository. The online repository can, for example, correspond to the product submission and management system 104. The online repository can receive the one or more electronic files, the associated product information and the one or more distribution parameters. The online repository can then operate to permit distribution of the digital product, as contained in the one or more electronic files, from a product distribution site (e.g., an online store) in accordance with the product information and the one or more distribution parameters. After the submission 208 of the digital product to the online repository, the digital product submission process 200 can end.

Figure 3:
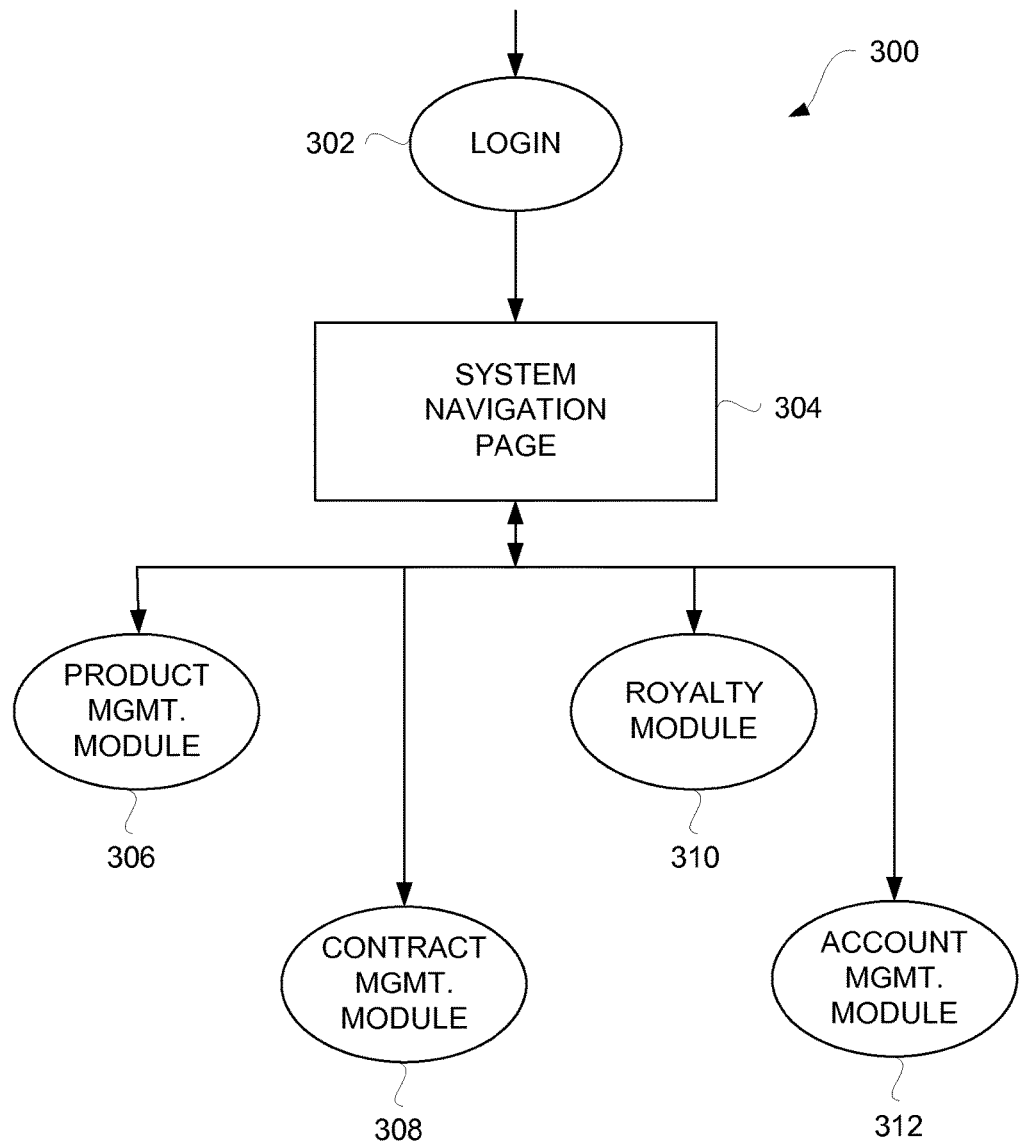
FIG. 3 is a block diagram of a product submission and management system according to one embodiment of the invention.

FIG. 3 is a block diagram of a product submission and management system 300 according to one embodiment of the invention. The product submission and management system 300 can, for example, represent one embodiment of the product submission and management system 104 illustrated in FIG. 1.

The product submission and management system 300 can require a login 302. For example, the login can require a user (i.e., digital product submitter) to provide a user name and a password. If the digital product submitter has successfully logged into the product submission and management system 300, the digital product submitter can be presented with a system navigation page 304. From the system navigation page 304, the digital product submitter can access one or more modules that are supported by the product submission and management system 300. According to one embodiment, as illustrated in FIG. 3, the modules supported by the product submission and management system 300 can include a product management module 306, a contract request module 308, a royalty module 310, and an account management module 312.

The product management module 306 can allow the digital product submitter to submit new products and control distribution of such new products. The product management module 306 can also allow the digital product submitter to edit previous submissions. The contract request module 308 can permit the digital product submitter to request a contract with an entity that provides the product distribution. Such a contract can enable the digital products submitter to distribute digital products using a product distribution site (e.g., online store) provided by the entity. The royalty module 310 can assist the digital product submitter in monitoring distribution of all digital products associated with the digital product submitter, including monitoring royalties that will or have in provided to the digital submitter due to distribution of such digital products. For example, the digital product submitter can access monthly royalty reports. The account management module 312 can provide centralized account management for the digital products, including, for example, access permissions, email settings, basic account information to be associated with the digital products matter.

Figure 4:
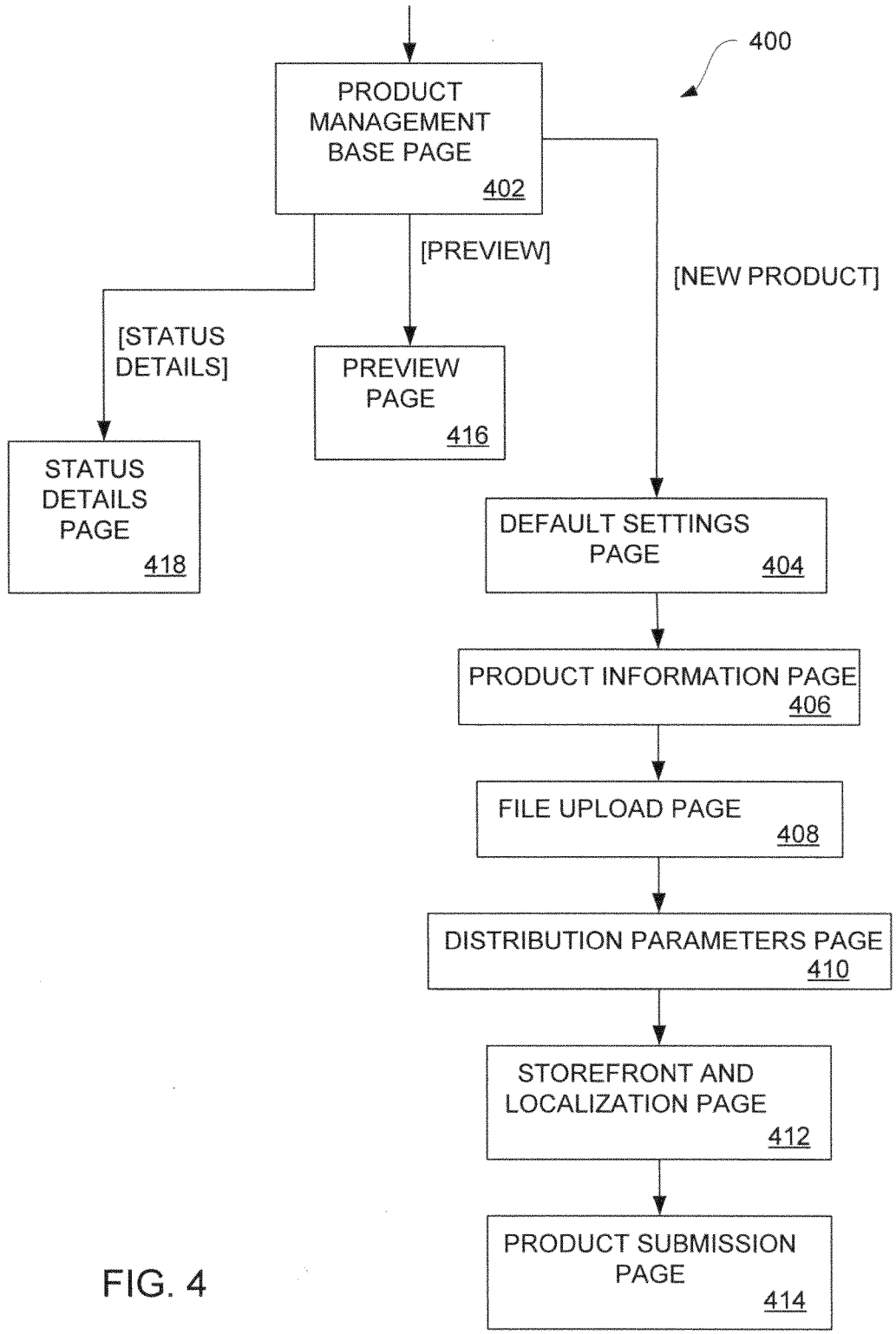
FIG. 4 is a block diagram of a project management system according to one embodiment of the invention.

FIG. 4 is a block diagram of a project management system 400 according to one embodiment of the invention. The project management system 400 includes a product management base page 402. From the project management base page 402 a user can navigate to different pages to facilitate (i) addition of a new product to the project management system 400, (ii) preview of product representations for distribution, and/or (iii) review of status details pertaining to one or more products.

When the user interacts with the product management base page 402, a default setting page 404 can be presented. The default setting page 404 allows the user to configure default settings. Following the default setting page 404, a product information page 406 can be presented. The product information page 406 allows a user to enter product information pertaining to a new product. Following the product information page 406, a file upload page 408 can be presented. The file upload page 408 allows the user to specify digital files to be uploaded and associated with the new product. Following the file upload page 408, a distribution parameters page 410 can be presented. The distribution parameters page 410 allows the user to enter various parameters that affect distribution, such as pricing information. Following the distribution parameters page 410, a storefront and localization page 412 can be presented. The storefront and localization page 412 can allow the user to specify all or certain storefronts from which the new product is to be available for distribution (e.g., purchase). Also, to the extent that some of such storefronts are in geographically different regions of the world, the localization information can also be provided by the user. For example, the localization information can provided foreign language versions of some of the product information. Following the storefront and localization page 412, a product submission page 414 can be presented. The product submission page 414 can allow the user to confirm data that has been provided for the new product and then cause the submission of such information to a product submission and management system, such as the product submission and management system 104 illustrated in FIG. 1.

Figure 5:
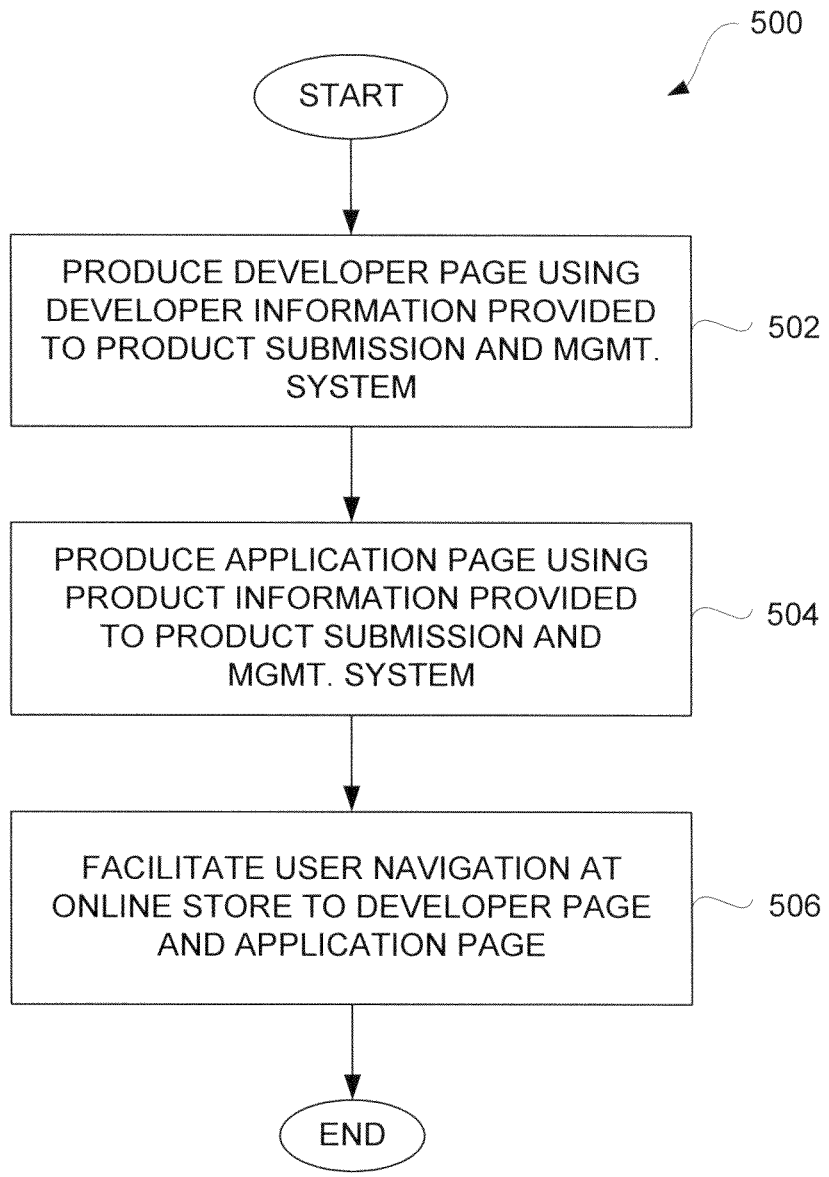
FIG. 5 is a flow diagram of an application configuration and distribution process according to one embodiment of the invention.

FIG. 5 is a flow diagram of an application configuration and distribution process 500 according to one embodiment of the invention. The application configuration and distribution process 500 can, for example, be performed by an online product distribution site, such as the product distribution site 102 illustrated in FIG. 1.

The application configuration and distribution process 500 is processing performed after submission of one more digital products to a product submission and management system. In particular, the application configuration and distribution process 500 produces 502 a developer page using developer information previously provided to the product submission and management system. Here, the developer page is an electronic information page that is specific to a particular developer of products, namely, application programs. The developer page can be produced 502 in advance of being utilized or can be dynamically generated as needed.

In addition, an application page can be produced 504 using product information previously provided to the product submission and management system. The application page is an electronic information page that is specific to a particular application program (computer program product) that has been submitted to the product submission and management system for distribution by an online product distribution site. As discussed below, persons interested in purchasing the particular application can gain access to the application page to review information pertaining to the particular application. The application page can be produced in 504 in advance of being utilized or can be dynamically generated as needed.

Thereafter, the application configuration and distribution process 500 can facilitate 506 user navigation at an online store to a developer page or an application page. Typically, the online product distribution side hosts an online store that stores numerous developer pages and numerous application pages. As potential purchasers search, browse or otherwise navigate through the various available applications at the online store, such potential purchasers can access appropriate developer pages or application pages. These developer pages or application pages thus assist potential purchasers in determining whether to purchase the associated application program. In one embodiment, the developer pages and the application pages contain user interface controls that allow potential purchasers to initiate purchase of the associated application program. Following the block 506, the application configuration and distribution process 500 can end.

Allowing users to navigate an online store that supports the sale of numerous application programs developed by numerous different developers requires a series of informational pages (webpages). The appropriate ones of the informational pages can be presented to the users as they navigate the online store. According to one embodiment, a graphical user interface system can provide a series of informational pages that can be accessed by the users. The series of informational pages can support a plurality of different functions with respect to the online store. Examples of supported functions can include searching, browsing, sorting, purchasing, updating, listing and reporting.

Figure 6A:
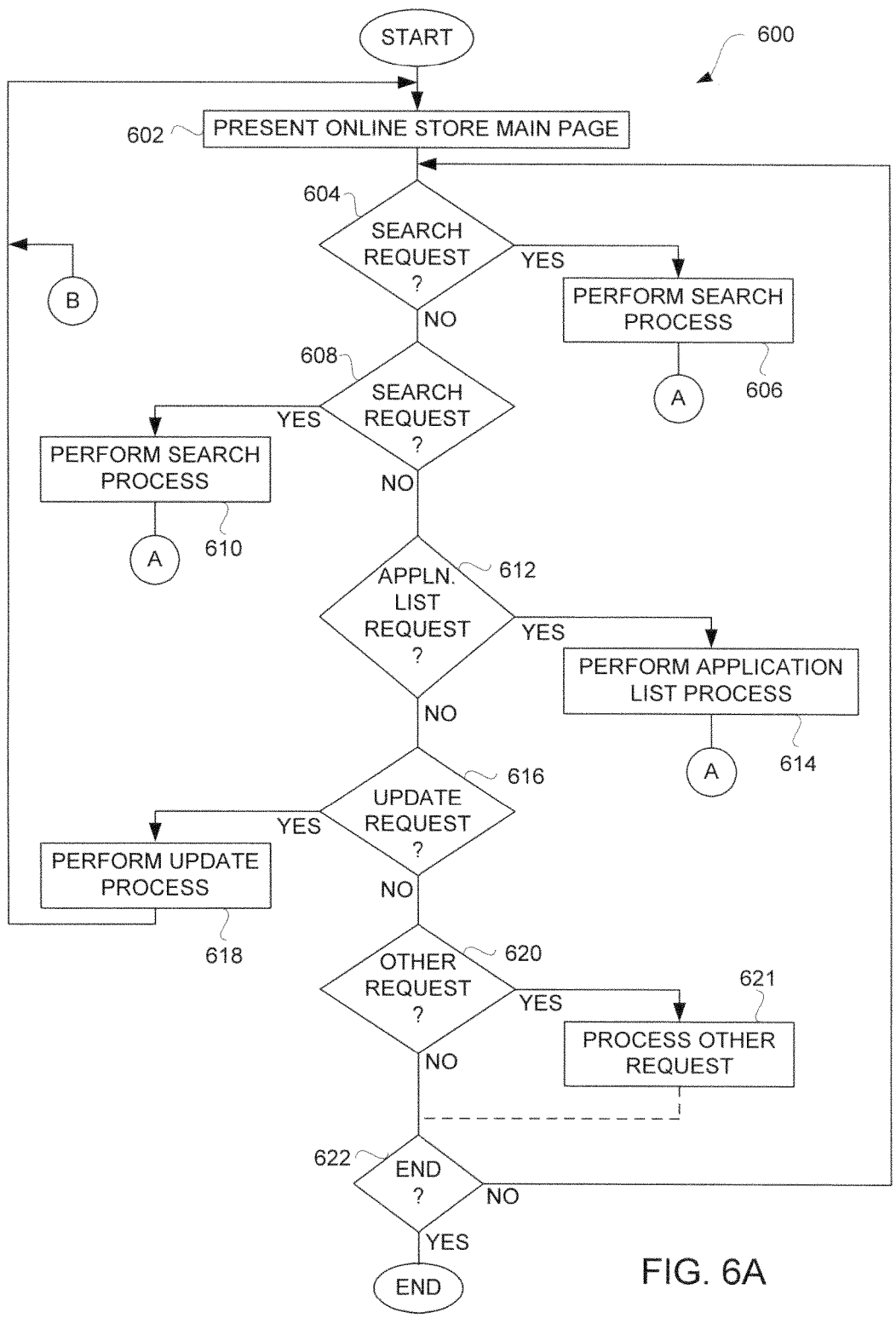
FIGS. 6A and 6B are flow diagrams of an online store navigation process according to one embodiment of the invention.
Figure 6B:
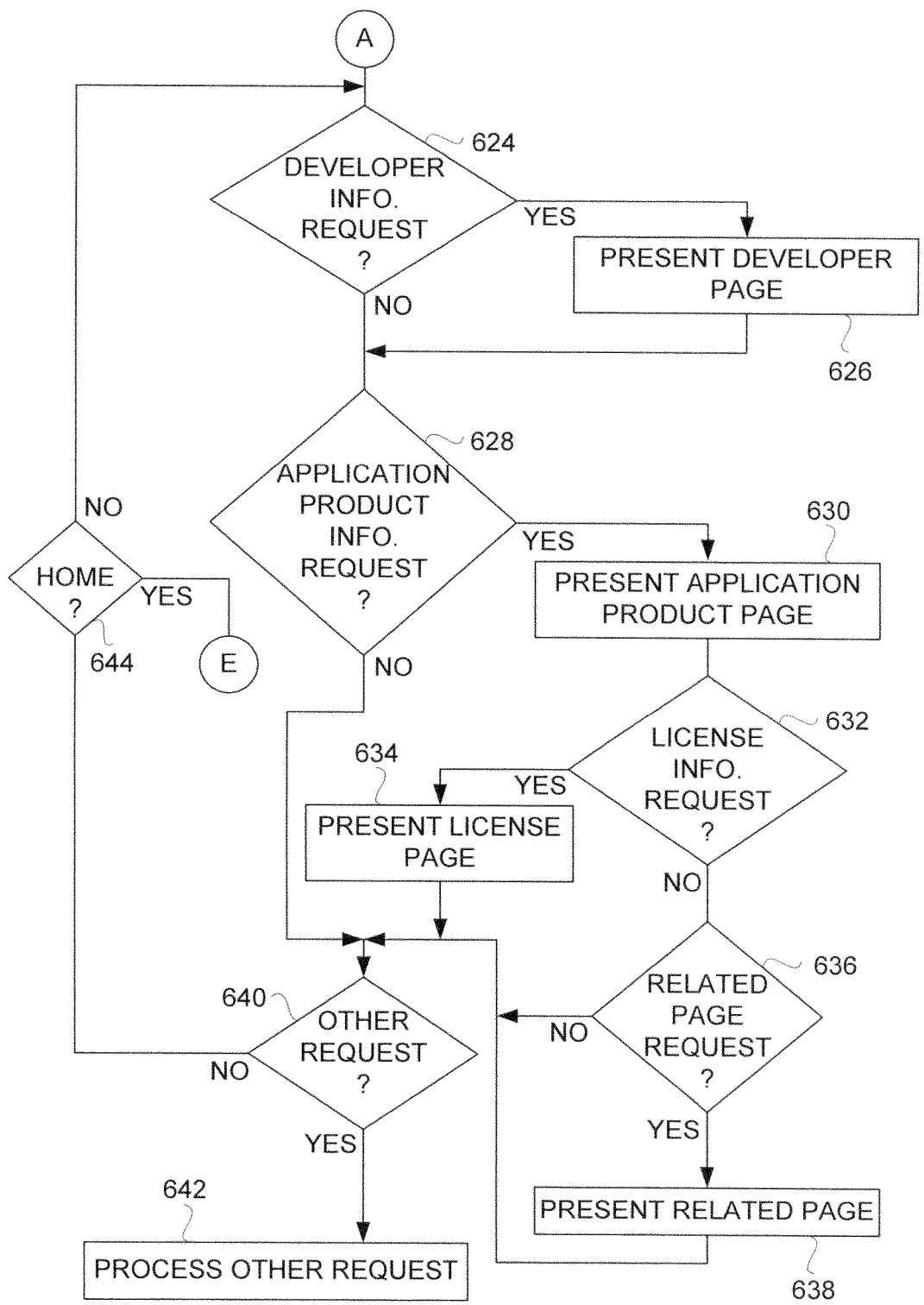

FIGS. 6A and 6B are flow diagrams of an online store navigation process 600 according to one embodiment of the invention. The online store navigation process 600 can present 602 an online store main page. From the online store main page, a user can initiate a search function, a browse function, an application listing function, update function or some other function. The functions can be available on the online store main page or can be available from other pages that can be navigated to (directly or indirectly) from the online store main page.

A decision 604 can determine whether a search request has been received. When the decision 604 determines that a search request has been received, a search process can be performed 606. On the other hand, when the decision 604 determines that a search request has not been received, a decision 608 can determine whether a browse request has been received. When the decision 608 determines that a browse request has been received, a browse process can be performed 610. Alternatively, when the decision 608 determines that a browse request has not been received, a decision 612 can determine whether an application list request has been received. When the decision 612 determines that an application list request has been received, an application list process can be performed 614.

On the other hand, when the decision 612 determines that an application list request has not been received, a decision 616 can determine whether an update request has been received. When the decision 616 determines that an update request has been received, an update process can be performed 618. Following the performance 618 of the update process, the online store navigation process 600 can return to repeat the block 602 and subsequent blocks.

Alternatively, when the decision 616 determines that an update request has not been received, a decision 620 can determine whether some other request has been received. When the decision 620 determines that in another request has been received, the other request can be processed 621. Here, the other request represents a general request that can depend upon the implementation of the online store navigation process 600. As examples, the other request might initiate a purchase, a preview, a download, a rating, a review, a navigation operation, etc. When the decision 620 determines that another request has not been made, a decision 622 can determine whether the online store navigation process 600 should end. If the decision 622 determines that the online store navigation process 600 should end, the online store navigation process 600 can end. On the other hand, if the decision 622 determines that the online store navigation process 600 should not and, the online store navigation process can return to repeat me decision 604 and subsequent blocks.

Following any of the blocks 606, 610 and 614, additional processing can be performed by the online store navigation process 600. The additional processing can, for example, provide users with access to developer information, application product information and other related information. Accordingly, as shown in FIG. 6B, be additional processing can begin with a decision 624 that can determine whether a developer information request has been received. When the decision 624 determines that a developer information request has been received, a developer page can be presented 626. The developer page is an electronic informational page that presents information concerning a particular developer. Alternatively, when the decision 624 determines that a developer information request has not been received (or following the block 626), a decision 628 can determine whether an application product information request has been received. When the decision 628 determines that an application product information request has been received, an application product page can be presented 630. The application product page is an electronic informational page that presents information concerning a particular application program.

After the application product page is presented 630, a decision 632 can determine whether a license information request has been received. Then the decision 632 determines that a license information request has been received, a license page can be presented 634. Alternatively, when the decision 632 determines that a license information request has not been received, a decision 636 can determine whether a related page request has been received. When the decision 636 determines that a related page request has been received, a related page can be presented 638. One example of a related page is a page containing information on other products, such as applications, that other users were interested in besides the application product of the application product page that has been presented 630.

Following the decision 628 when an application product information request is not received, following the block 634, following the decision 636 when a related page request is not received, or following the block 638, a decision 640 can determine whether another request has been received. The another request represents a generic request they can also be processed by the online store navigation process 600. When the decision 640 determines that another request has been received, the another request can be processed 642.

On the other hand, when the decision 640 determines that another request has not been received, a decision 644 can determine whether a home request has been received. A home request is a navigation command to go back to display of a home page that was previously displayed. When the decision 644 determines that a home request has been received, the online store navigation process 600 can return to repeat the block 602 which represents the beginning of the online store navigation process 600. Alternatively, when the decision 644 determines that a home request has not been made, the online store navigation process 600 can return to repeat the decision 624 so that the user can continue to navigate to a developer page or an application product page.

Figure 7A:
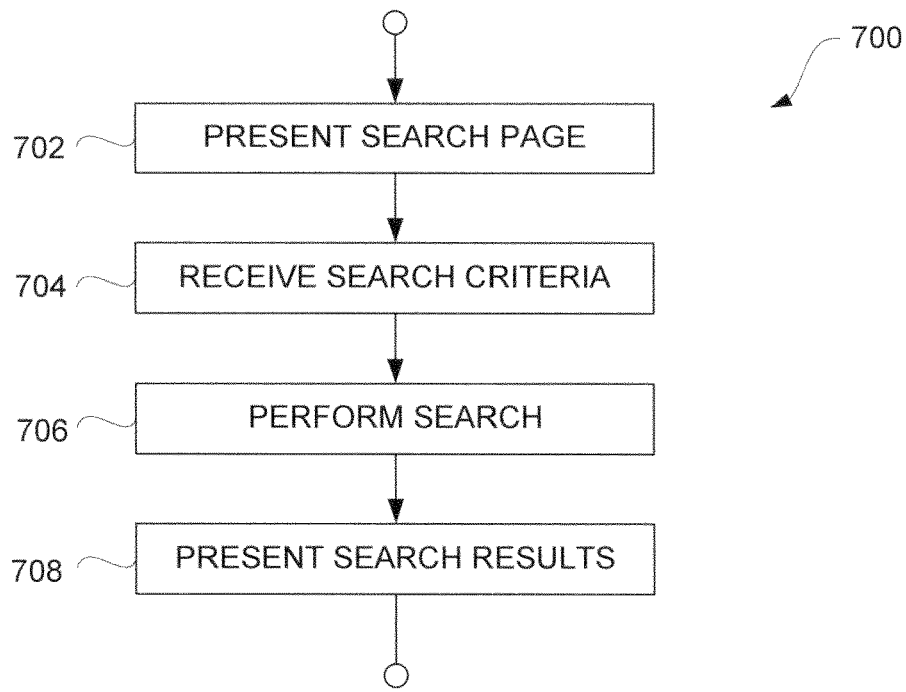
FIG. 7A is a flow diagram of a search process according to one embodiment of the invention.

FIG. 7A is a flow diagram of a search process 700 according to one embodiment of the invention. The search process 700 is, for example, processing that can be performed by the block 606 of the online store navigation process 600 illustrated in FIG. 6A. The search process 700 initially presents 702 into a search page. In one implementation, the search page is a graphical user interface that provides a text box in which a search string can be entered by a user. Additionally, the graphical user interface might also permit the user to select a category, type, price, genre or other attribute of digital products that can be utilized in narrowing search results. After the search page is presented 702, search criteria can be received 704. The search criteria being received represents the search string and possibly other search attributes to be applied. Thereafter, the search can be performed 706. In one embodiment, the search operation searches a database of digital products to determine those one or more digital products that satisfy the search criteria. After the search is being performed 706, the search results can be presented 708. From the search results, the user can further navigate to (i) obtain additional information on one or more application programs provided or identified by the search results, or (ii) obtain additional information on one or more developers of such application programs.

Figure 7B:
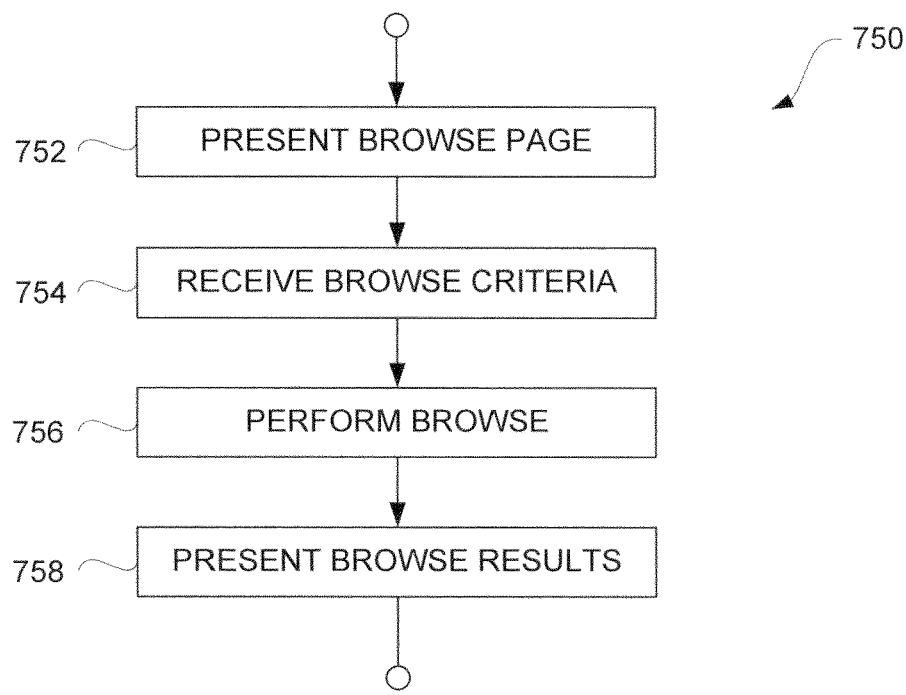
FIG. 7B is a flow diagram of a browse process according to one embodiment of the invention.

FIG. 7B is a flow diagram of a browse process according to one embodiment of the invention. The browse process 750 can, for example, be performed by the block 610 of the online store navigation process 600 illustrated in FIG. 6A. The browse process 750 can initially present 752 a browse page. The browse page can facilitate a user with identifying browse criteria to be utilized in browsing through the plurality of digital products that are made available at the online store. Next, browse criteria can be received 754. The browse criteria can be provided by the user through interaction with the browse page. After the browse criteria has been received 754, a browse operation can be performed 756. Since the browse process yields a list of one or more digital products that satisfy the browse criteria, browse results can then be presented 758. From the browse results, the user can further navigate to (i) obtain additional information on one or more application programs provided or identified by the browse results, or (ii) obtain additional information on one or more developers of such application programs.

Figure 8:
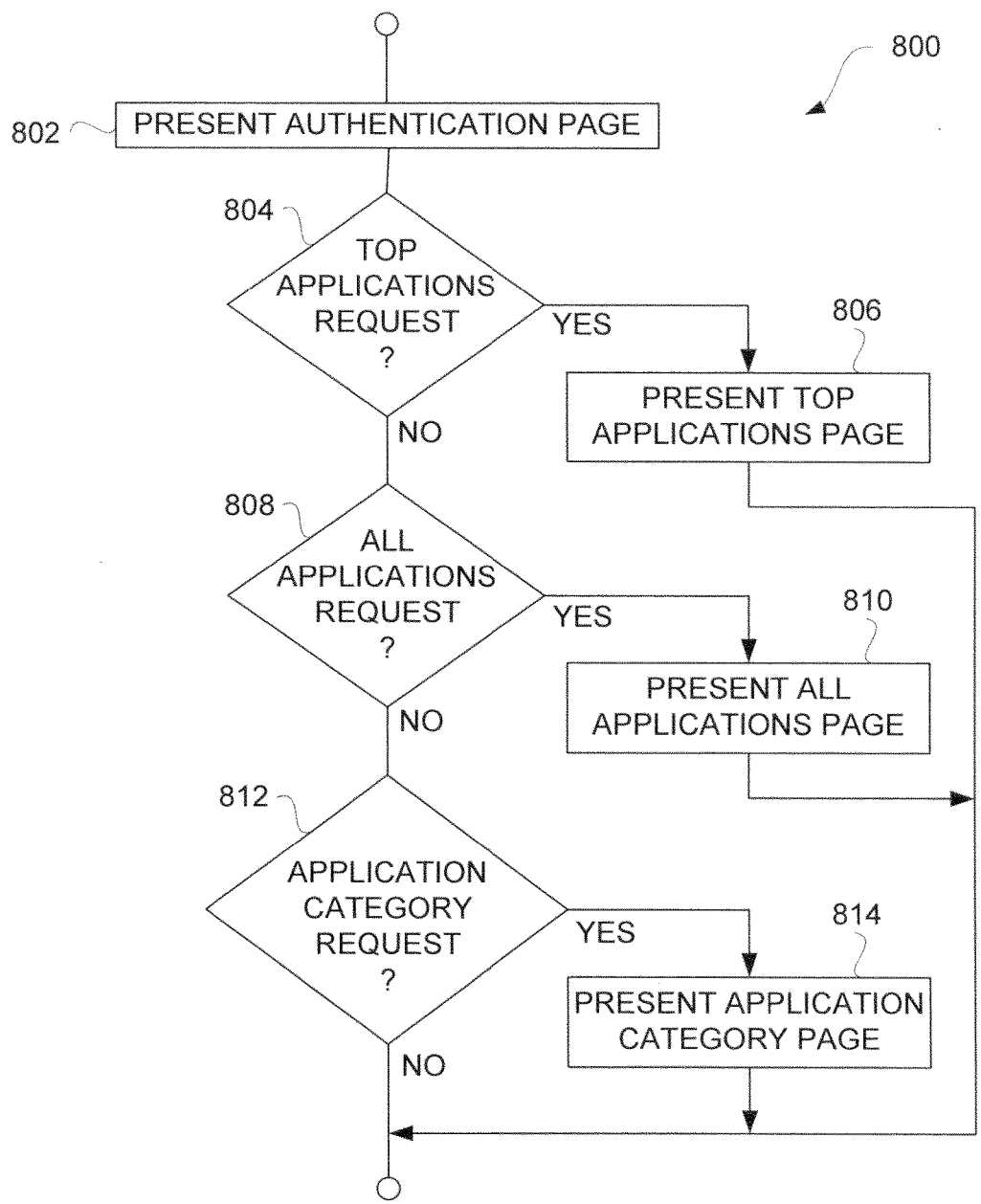
FIG. 8 is a flow diagram of an application list process according to one embodiment of the invention.

FIG. 8 is a flow diagram of an application list process 800 according to one embodiment of the invention. The application list process 800 can, for example, perform processing associated with the block 614 of the online store navigation process 600 illustrated in FIG. 6A. The application list process 800 can present 802 an application main page. The application main page can present an informational electronic page (webpage) that primarily contains information on application programs. The application main page can also facilitate users in navigating to more particular informational electronic pages that contain a subset of the available application programs. Hence, the application list process 800 can include a decision 804 that determines whether a top applications request has been received. When a top applications request has been received, a top applications page can be presented in 806. Here, the top applications page allows the user to quickly navigate to those application programs that are most popular (i.e., top applications). In one implementation, the top applications page can be provided for all applications or just for free applications. Alternatively, when the decision 804 determines that a top applications request has not been received, a decision 808 can determine whether an all applications request has been received. When the decision 808 determines that an all applications request has been received, an all applications page can be presented 810. In one implementation, the all applications page can be provided for all applications or just for all free applications. When the decision 808 determines that an all applications request has not been received, a decision 812 can determine whether an application category request has been received. When the decision 812 determines that an application category request has been received, an application category page can be presented 814. Following the decision 812 when an application category request has not been received or following any of the blocks 806, 810 or 814, the application list processed 800 can end.

Figure 9:
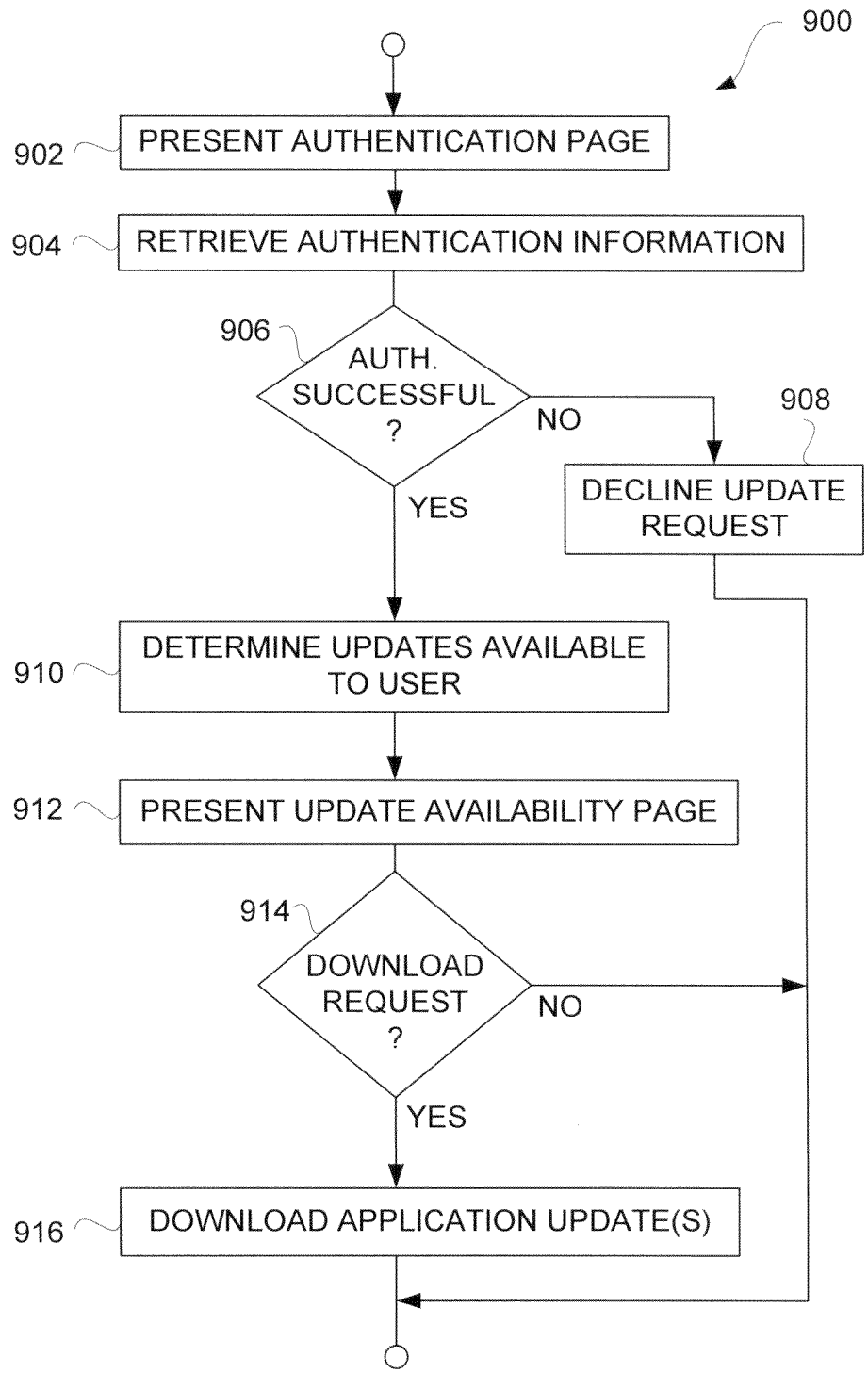
FIG. 9 is a flow diagram of an application update process according to one embodiment of the invention.

FIG. 9 is a flow diagram of an application update process 900 according to one embodiment of the invention. The application update process 900 can, for example, pertain to processing performed by the block 614 of the online store navigation process 600 illustrated in FIG. 6A. The application update process can present 902 an authentication page. In response to the authentication page, a user that is requesting to update one or more of its previously purchased application programs, can provide authentication information. Hence, authentication information is then received 904. A decision 906 can then determine whether the user has been successfully authenticated using the authentication information. When the decision 906 determines that the user has not been successfully authenticated, the update request can be declined 908. In this case, the application update process 900 ends without having performed any application update.

On the other hand, when the decision 906 determines that the user has been successfully authenticated, the application update process 900 can determine 910 those updates that are available to the user. An update availability page can then be presented 912 to the user. The update availability page can inform the user of the one or more updates to previously purchased application programs that are now available to the user. These updates may be provided free of charge or may require payment of a fee. Next, a decision 914 can determine whether a download request has been received. In one embodiment, from the update availability page, the user can elect to proceed to download the one or more available updates or can decline to download any of the available updates. Of course, if there are no updates available to the user, the decision 914 can effectively likewise determined that download is not to be performed. In the case where the decision 914 determines that a download request has been received, the one or more available application updates are downloaded 916 for the benefit of the user. Typically, the one or more application updates are downloaded 916 to a client machine, such as a personal computer, that is accessing the online store via a network connection. In cases where the application updates are not for previous applications on the personal computer, but instead for another device that couples to the personal computer on occasion, then the application updates are eventually delivered and installed on the another device. For example, the another device might a portable computing device, such as a portable media player, a mobile telephone, or a personal digital assistant, that subsequently couples to the personal computer. In such case, when the portable computing device couples to the client machine, the application updates can be provided to the portable computing device that has the corresponding previous applications installed thereon. A synchronization operation between the client machine and the portable computing device can be used to transfer the application updates from the client machine to the portable computing device. Thereafter, following any downloading 916, the application update process 900 can end.

Figure 10:
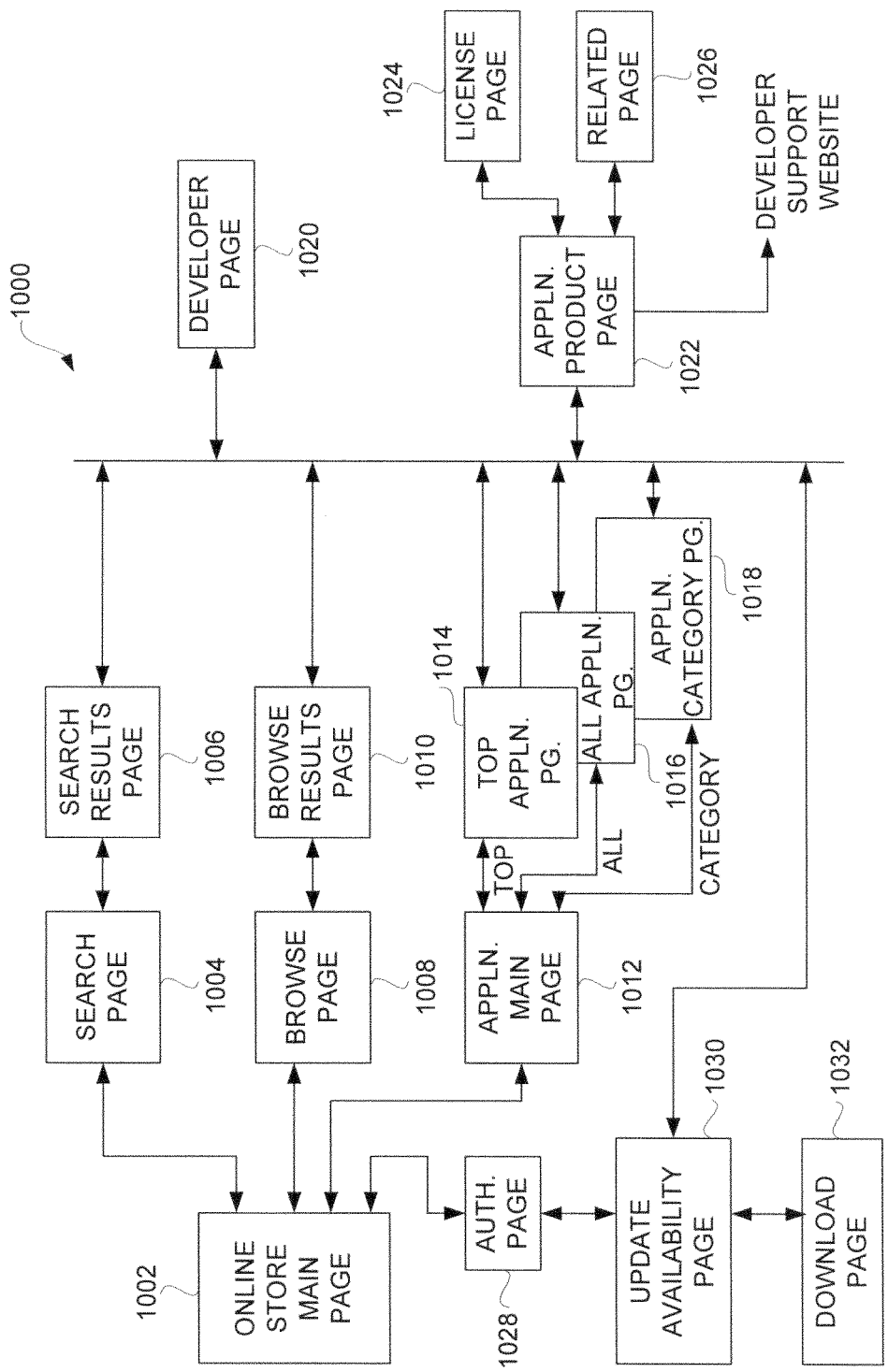
FIG. 10 is a diagram of a graphical user interface system according to one embodiment of the invention.

FIG. 10 is a diagram of a graphical user interface system 1000 according to one embodiment of the invention. The graphical user interface system 1000 includes a plurality of different electronic informational pages. These electronic informational pages (hereafter abbreviated to "pages") can also be referred to as webpages or graphic user interfaces. In any case, the plurality of different electronic informational pages are interrelated such that a user can often navigate to different pages in a variety of different ways, such of which are described below with reference to FIG. 10. Advantageously, the graphical user interface system 1000 supports user navigation through various different pages to access developer information as well as application product information that are made available online for various application programs (computer program products) being offered for distribution at an online store.

The graphical user interface system 1000 includes an online store main page 1002. From the online store main page 1002, a user can navigate to a search page 1004 that can be utilized to produce a search results page 1006. Also, from the online store main page 1002, a user can navigate to a browse page 1008 that can be utilized to produce a browse results page 1010. Still further, from the online store main page 1002, a user can navigate to an application main page 1012, which provides information substantially dedicated to a plurality of different application programs. From the application main page 1012, a user can navigate to a number of different application listing pages. For example, if the user is interested in a listing of top applications, the user can navigate to a top application page 1014. As another example, if the user is interested in all applications (whether available for free or for a fee), the user can navigate to an all applications page 1016. As still another example, if the user is interested in a particular category of applications, the user can navigate to an application category page 1018.

In addition, the graphical user interface system 1000 includes a developer page that provides information pertaining to a developer. Since the underlying system supports a plurality of different developers, the graphical user interface system 1000 can provide navigation to the developer page 1002 for a particular developer.

The graphical user interface system 1000 also includes application product pages 1022 for the plurality of application programs that are offered for distribution by a product distribution site (e.g., online store). Hence, the graphical user interface system 1000 can facilitate the user in navigating to an application product page 1022 pertaining to a particular application product. More particularly, a user can navigate from various points in the graphical user interface system 1000 to either the developer page 1020 or the application product page 1022 that are relevant to a particular application that has been identified through searching, browsing or listing. Hence, as an example, the user can navigate from the search results page 1006, the browse results page 1010, the top application page 1014, the all application page 1016 or the application category page 1018 to either the developer page 1020 or the application product page 1022 for a particular application. Additionally, a user can navigate from the application product page 1022 to a license page 1024 or a related page 1026. The license page 1024 can provide the user with access to a license agreement that applies to the particular application product. The related page 1026 can provide the user with access to recommendations or correlated purchases from others that may be of interest. Still further, the application product page can also provide a link (i.e., hyperlink) to a developer support website. The network location (address) for the developer support website can be provided by the developer when submitting the application product to the product submission and management system. Accordingly, if the user is having technical difficulties with a particular application product, the user can navigate to the corresponding application product page 1022 and then select (e.g., "click-on") the available link to be directed to a developer support website.

The online store main page 1002 can also support user navigation to an update operation. The update operation can make available to users those application updates that are available to the user with respect to prior purchases. For example, if the user has previously purchased from an online store an application program that has recently been updated to correct a deficiency or provide a minor enhancement, such an updated application program can be made available to the prior purchaser. In one implementation, the updated application program can be provided free of charge to the prior purchaser. Hence, the online store main page 1002 can provide the user with the ability to initiate an update process whereby the user can obtain the available updates for the application programs they have previously purchased. In one implementation, the online store main page 1002 can provide a user interface control (e.g., hyperlink) to initiate the update process or to navigate to another page from which the update process can be initiated. Optionally, the online store main page 1002 or the another page can also include a numerical indication of the number of available updates. When a user selects the user interface control, the user can navigate to an authentication page 1028. The authentication page 1028 can require that the user enter authentication information so that the system can authenticate the user prior to permitting the user to update any application programs. In the event that the authentication is successful, than an update availability page 1030 can be presented to the user. The update availability page can inform the user of one or more updates that may be available for download by the user. In the event that there are one or more available updates, the user can then elect to decline or proceed with the updates. If the user request the updates, the user can be directed to a download page 1032 which indicates that download is either in process or has been completed.

Another aspect of the invention pertains to graphical user interfaces. The graphical user interfaces can present various pages (or screens) to assist a user in interacting with an online product distribution site. FIGS. 11-26 are exemplary screen illustrations pertaining to representative graphical user interfaces. Each of the different exemplary screen illustrations can be considered a graphical user interface.

Figure 11:
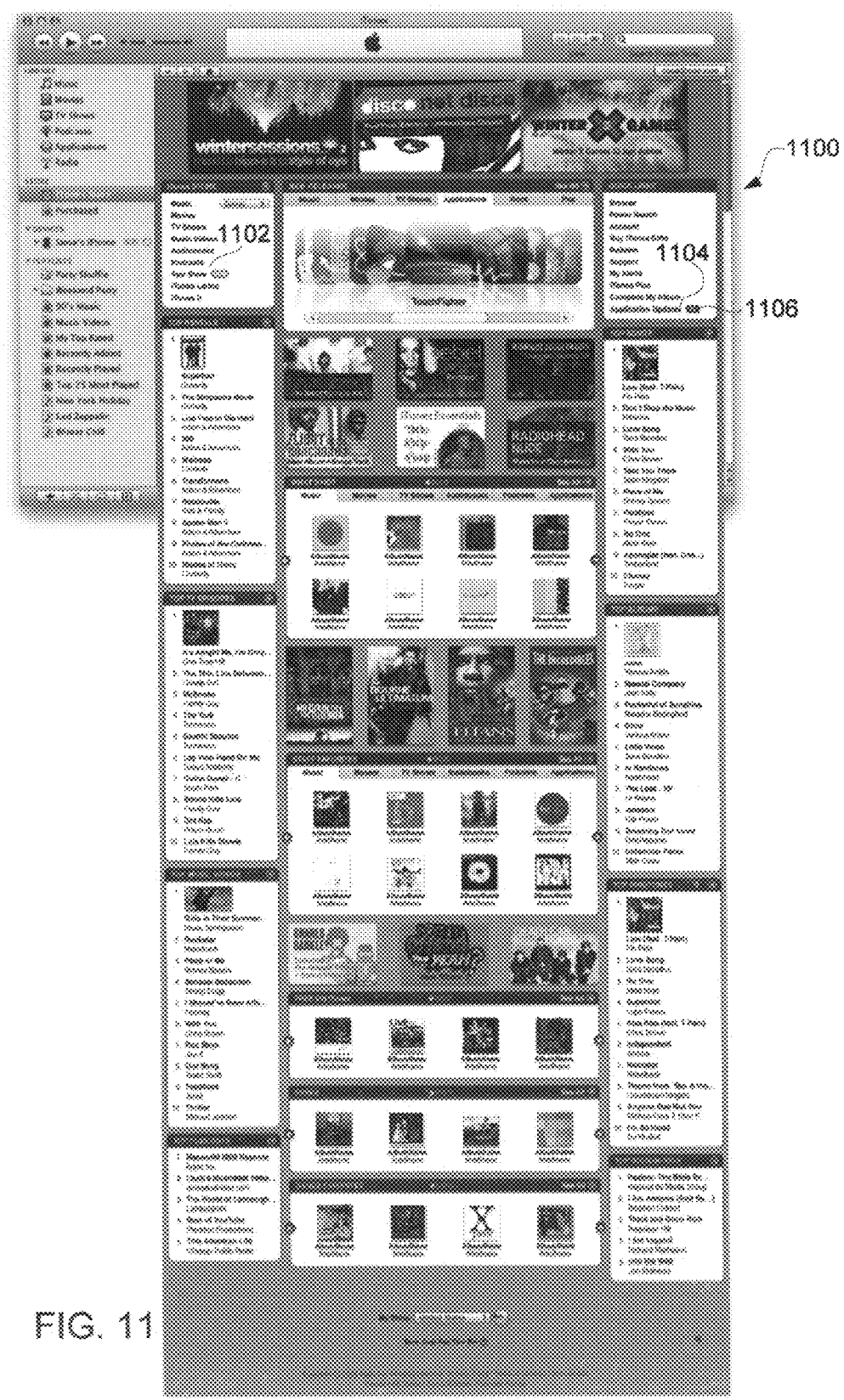
FIGS. 11-26 are exemplary screen illustrations pertaining to representative graphical user interfaces.

FIG. 11 is an exemplary screen illustration of an online store main page 1100 according to one embodiment of the invention. The online store main page 1100 can, for example, represent one implementation of the online store main page 1002 illustrated in FIG. 10. The online store main page 1100 presents information pertaining to a plurality of digital products that are available for purchase (or rental) by an online store. In this example, the online store is the iTunes™ store. The online store main page 1100 can categorize or organize the numerous digital products to facilitate user understanding and/or navigation. Among other things, the online store main page 1100 can include a user interface control 1102 that enables a user to navigate to an application store. The application store can represent a portion of the online store that pertains exclusively to application programs. The online store main page 1100 can also include a user interface control 1104 for initiating application updates. Additionally, the online store main page 1100 can also provide an indication 1106 that represents availability of application updates for the particular user of the online store. As illustrated in FIG. 11, the indication 1106, in one embodiment, can pertain to a numerical indicator, where the numeric value provided in the numerical indicator specifies the number of application updates that are available to the particular user. As used herein, many of the user interface controls can pertain to links, such as hyperlinks to other pages.

Figure 12:
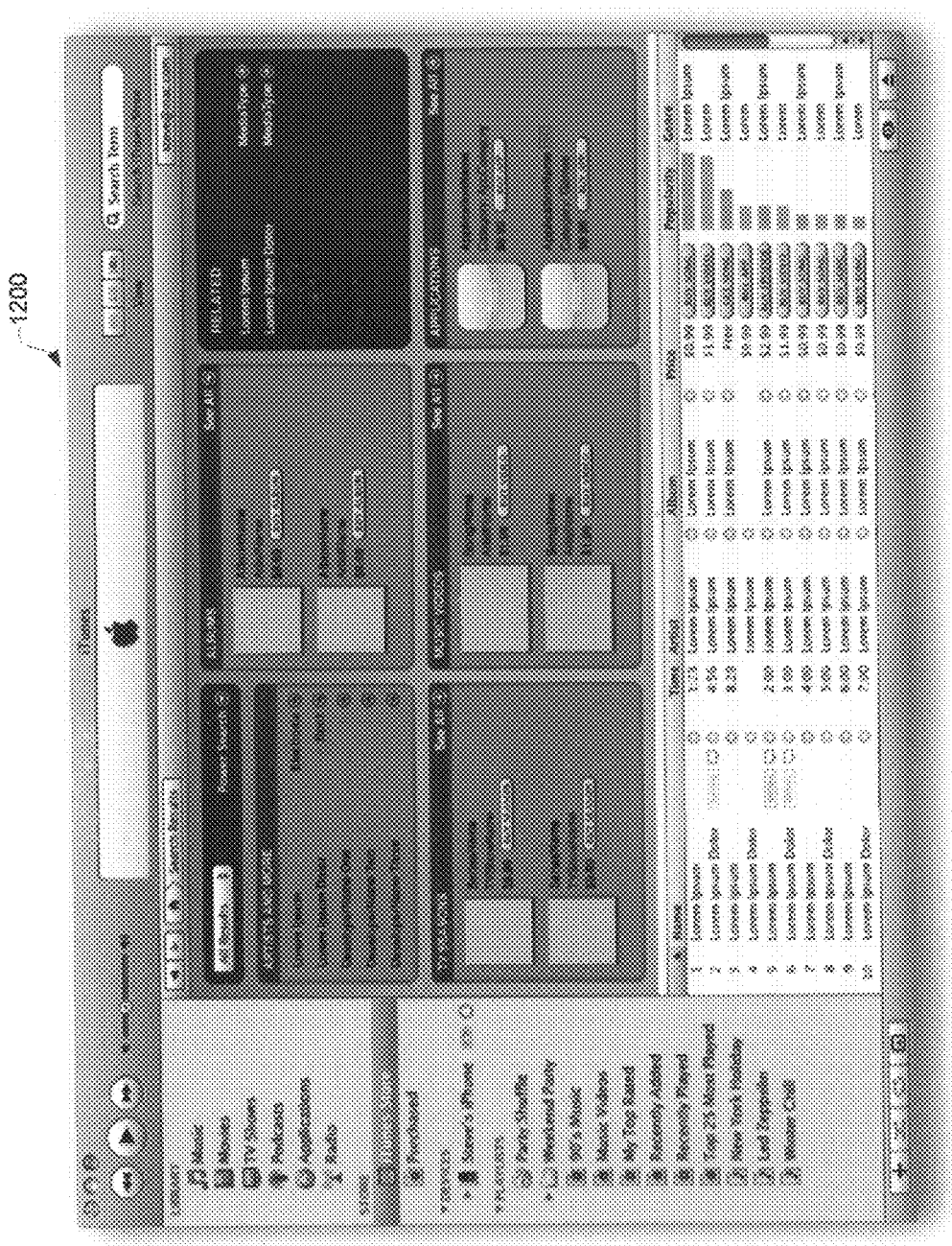

FIG. 12 is an exemplary screen illustration of a search results page 1200 according to one embodiment of the invention. The search results page 1200, for example, represents one implementation of the search results page 1006 illustrated in FIG. 10. The search results page 1200 can display a plurality of digital products that satisfy previously identified search criteria. In the search results page 1200 illustrated in FIG. 12, the search results include digital products of various different types. For example, the digital products that satisfied the search criteria can include matching music (e.g., albums), TV seasons, music videos, and application programs. A user interface control that facilitates user purchase of the corresponding digital product can be provided proximate to displayed representations for each of these digital products.

Figure 13:
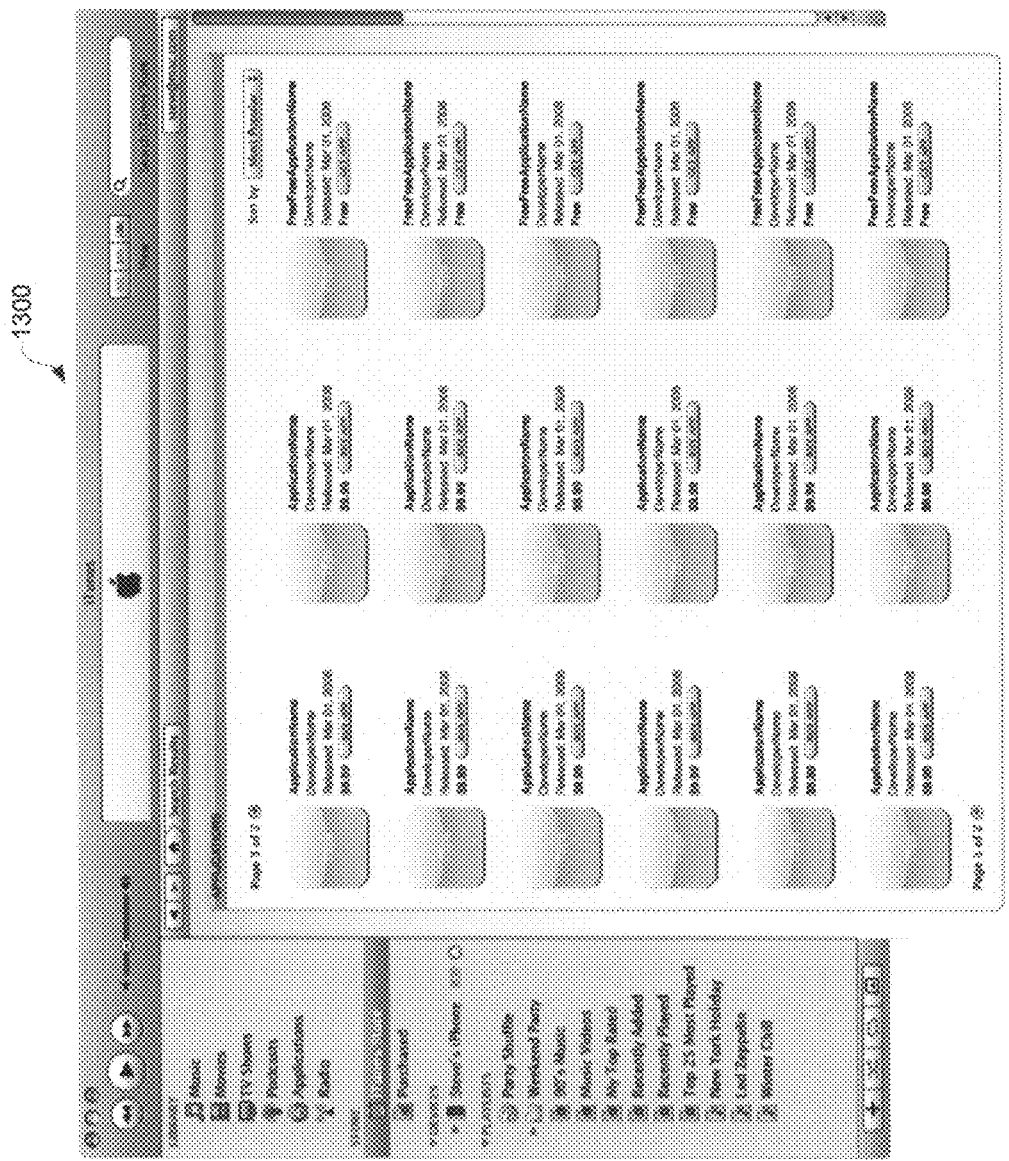

FIG. 13 is an exemplary screen illustration of a search results page 1300 according to one embodiment of the invention. The search results page 1300, for example, represents another implementation of the search results page 1006 illustrated in FIG. 10. The search results page 1300 can display a plurality of application programs that satisfy previously identified search criteria. In the search results page 1300 illustrated in FIG. 13, the search results include a plurality of application programs sorted by popularity.

Figure 14:
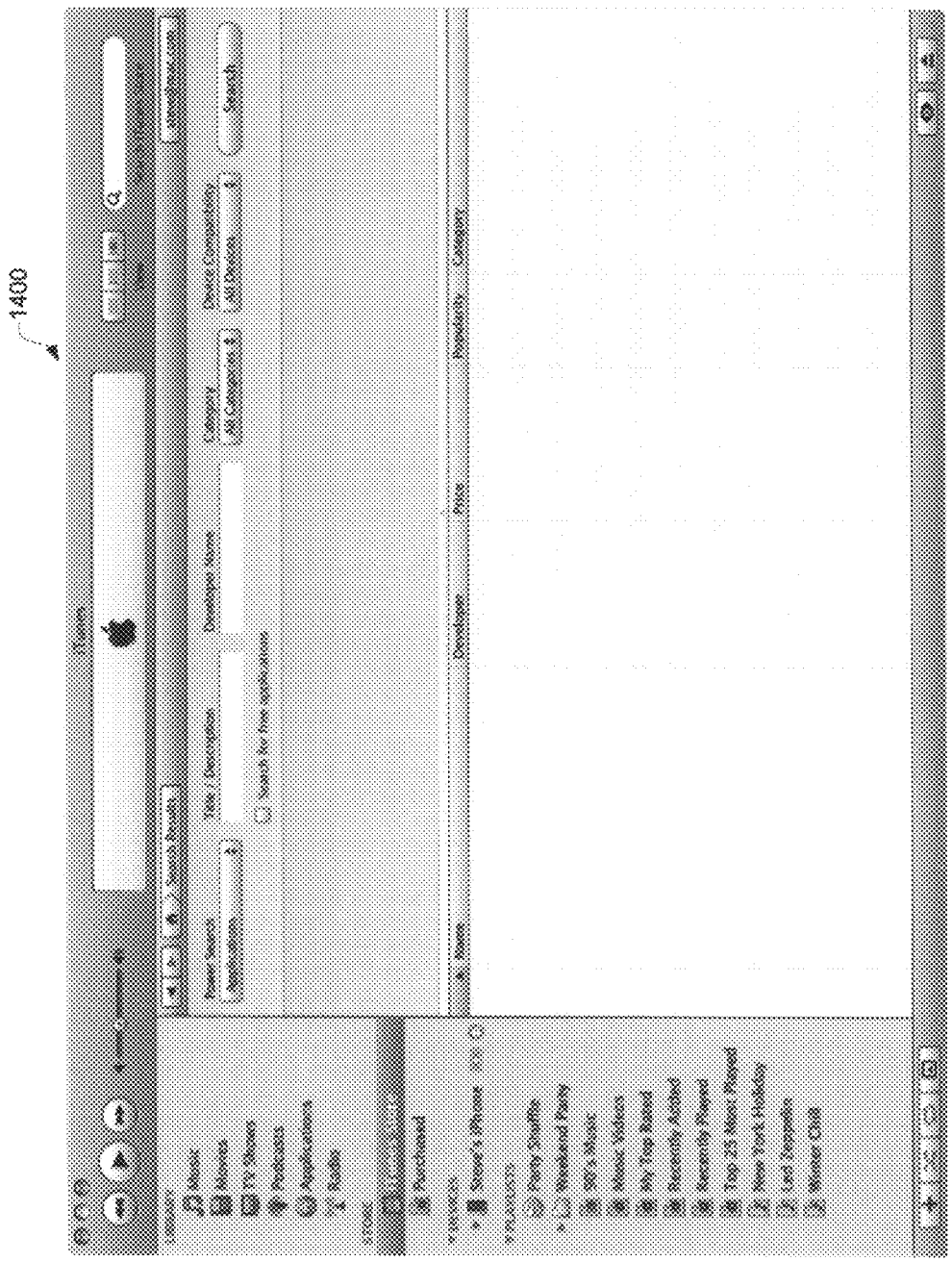

FIG. 14 illustrates an exemplary screen illustration of an advanced search page 1400 according to one embodiment of the invention. The advanced search page 1400 can permit a user to search the online store for application programs based on search criteria provided for one more specified fields. The fields can pertain to: title/description, developer name, particular category, or device compatibility. For example, device compatibility can specify particular type device on which the application programs are to be executed. Additionally, the application search can be limited to those application programs that are provided free of charge.

Figure 15:
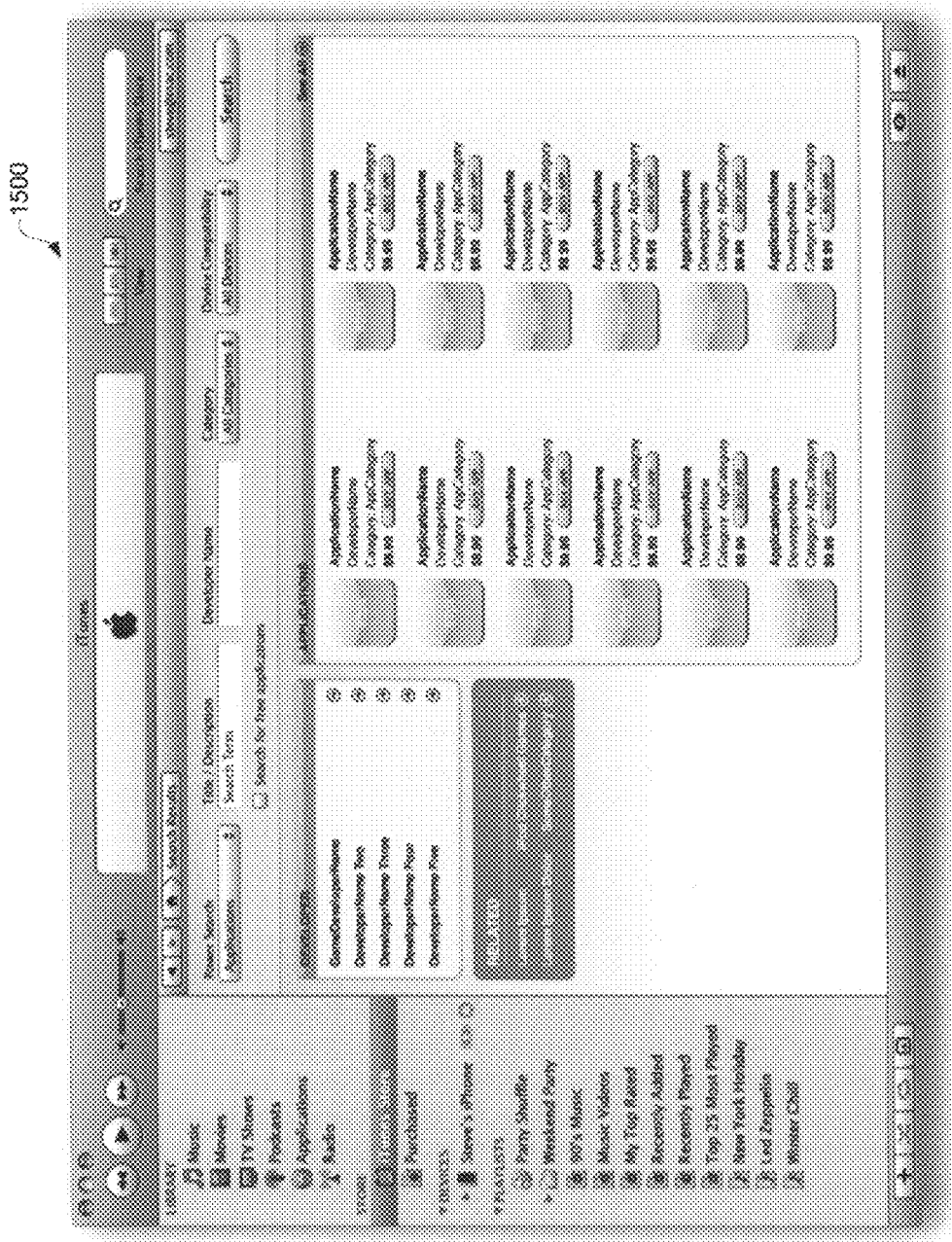

FIG. 15 illustrates an exemplary screen illustration of a search results page 1500 according to one embodiment of the invention. The search results page 1500 can represent search results produced by an advanced search carried out in accordance with utilization of the advanced search page 1400.

Figure 16:
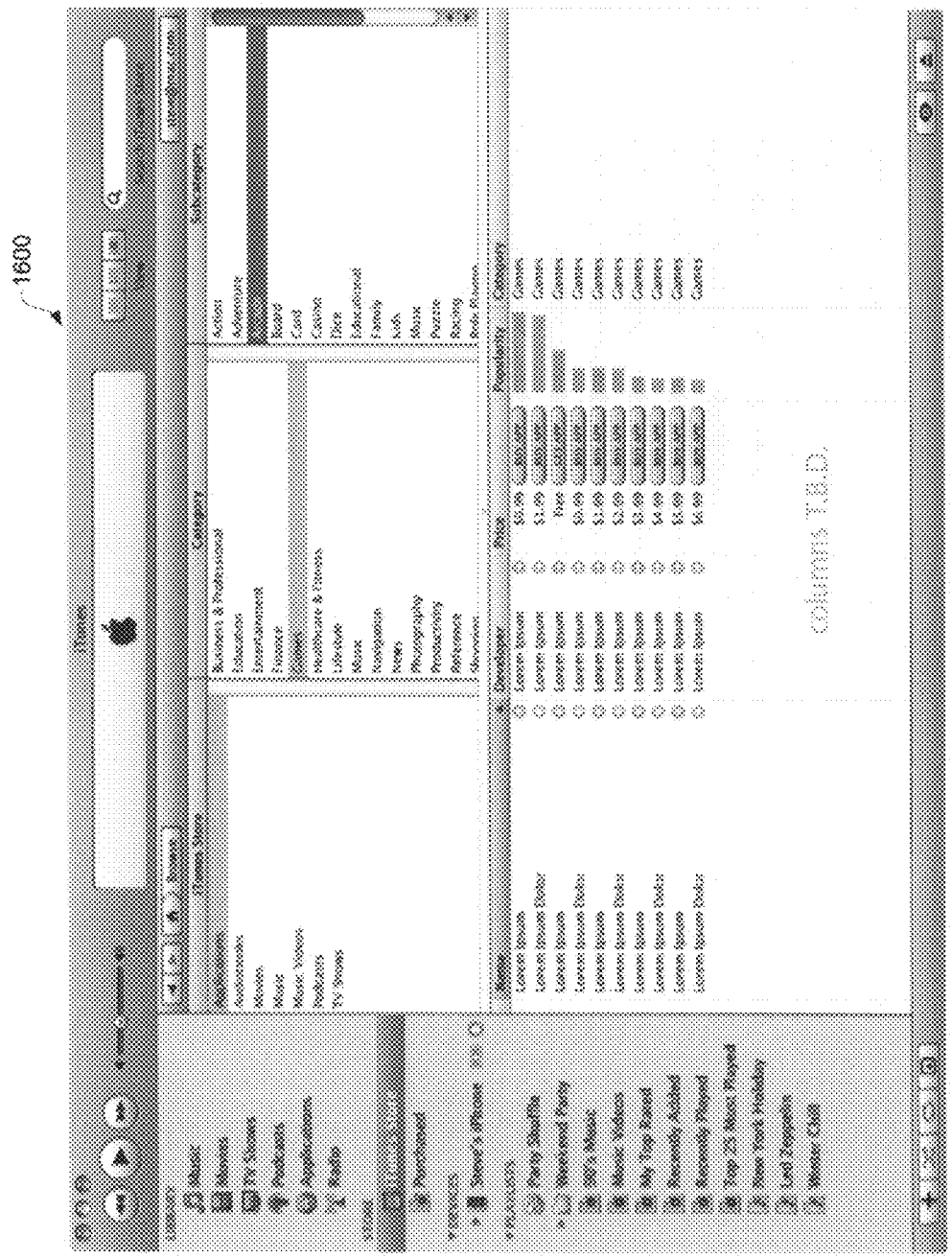

FIG. 16 illustrates an exemplary screen illustration of a browse page 1600 according to one embodiment of the invention. The browse page 1600 can, for example, represent one implementation of the browse page 1008 illustrated in FIG. 10. As illustrated in FIG. 16, the browse operation can be performed by a user specifying a type of digital product of interest, followed by a category selection, and then followed by a subcategory selection. As each of these selections is made, a lower window region can be updated to list those one or more digital products that satisfied the browse criteria. For example, as illustrated in the browse page 1600, the user has selected "applications" as the digital product type, selected "games" as the appropriate category, and has selected "arcade" as the selected subcategory. Accordingly, the lower window region lists those application programs available from the online store that are arcade games.

Figure 17:
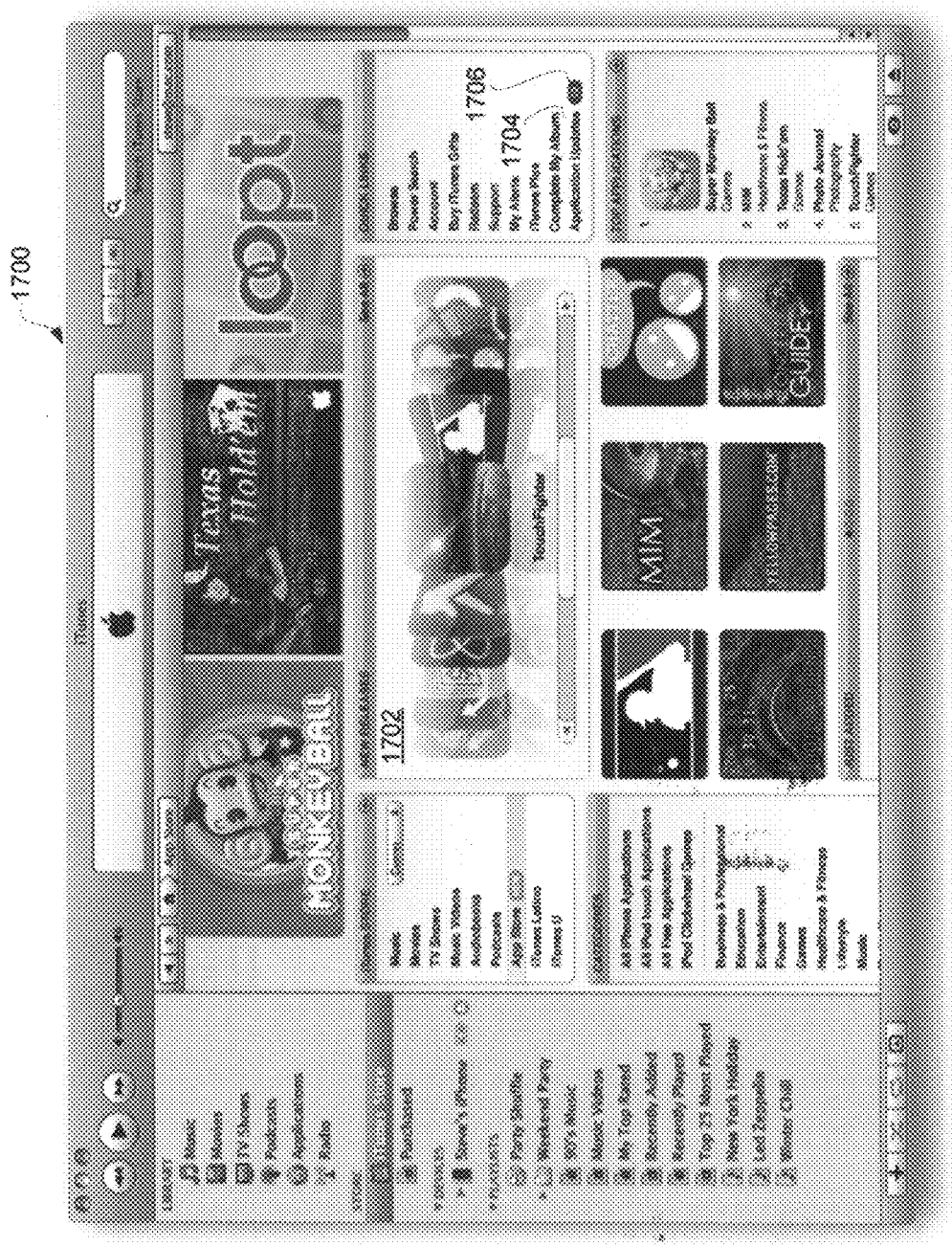

FIG. 17 illustrates an exemplary screen illustration of an application main page 1700 according to one embodiment of the invention. The application main page 1700 can be presented to a user that selects the user interface control 1102 on the online store main page 1100 illustrated in FIG. 11. The application main page 1700 principally displays information pertaining to applications that are available for distribution from an online store. The applications can be organized or categorized to assist users in locating applications of interest or to promote certain applications. For example, a user can specify a particular category of application programs to better target the applications being presented by the application main page 1700. Examples of categories include: business, education, entertainment, finance, games, health care & fitness, lifestyle, music, navigation, news, photography, productivity, reference, social networking, sports, travel, utilities, and weather. Some specialized categories (or groupings) can also be utilized, such as all iPhone™ applications, all iPod Touch™ applications, all free applications, and iPod™ games. Other organizational categories can include top applications, top free application, new releases, just added, staff favorites, etc. Search or navigating through the application programs can be done through searching, browsing, category selections. A user can select any application portrayed on the application main page 1700. In one embodiment, the presentation of application programs can utilize an image-based browser 1702 that can be animated. As another example, applications can organizationally grouped into new releases, just added, top applications and various other groupings. From the application main page 1700, the user can also request application updates. The application main page 1700 can also include a user interface control 1704 that enables a user to request application updates. An indication 1706 can also be display proximate to the user interface control 1704 to signal availability of application updates for the particular user of the online store. In one implementation, the indication 1706 can pertain to a numerical indicator specifying a number of application updates that are available to the particular user.

Figure 18:
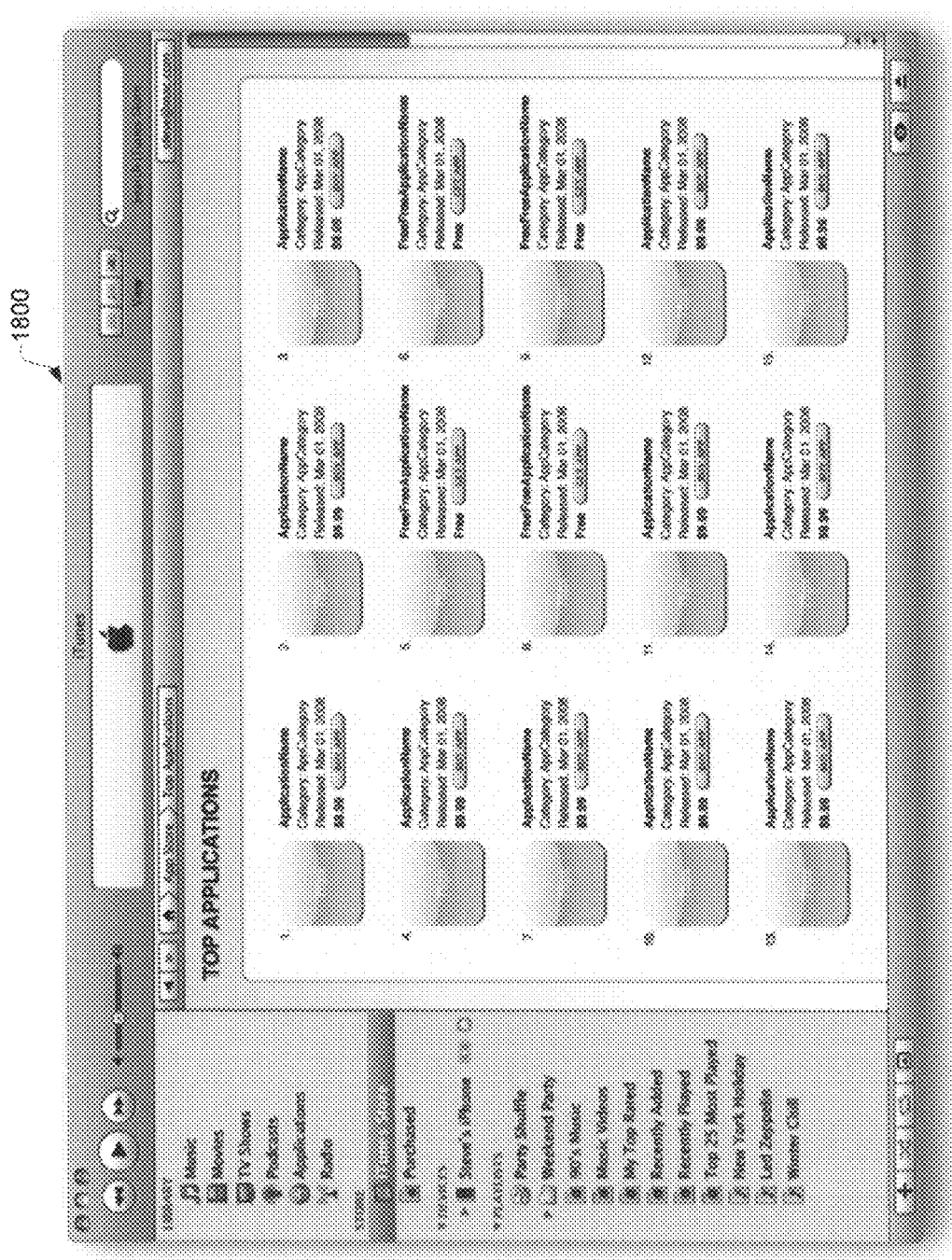

FIG. 18 illustrates an exemplary screen illustration of a top applications page 1800 according to one embodiment of the invention. The top applications page 1800 can, for example, represent one implementation of the top applications page 1014 illustrated in FIG. 10.

Figure 19:
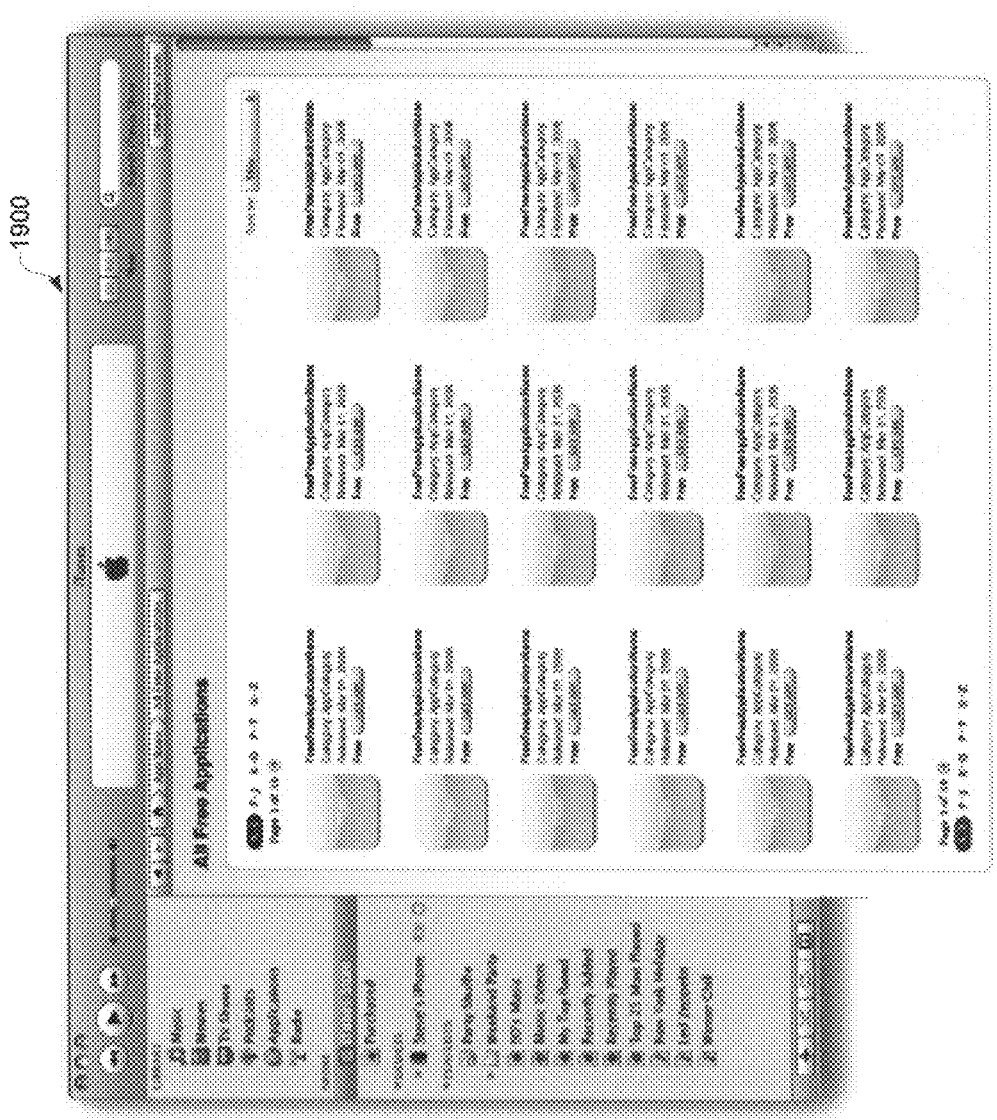

FIG. 19 illustrates an exemplary screen illustration of an all applications page 1900 according to one embodiment of the invention. The all applications page 1900 can, for example, represent one implementation of the all applications page 1016 illustrated in FIG. 10. The all applications page 1900 illustrates a plurality of application programs that are available free of charge and sorted by popularity. In the available applications can also be sorted by different criteria, such as title, release date, etc.

Figure 20:
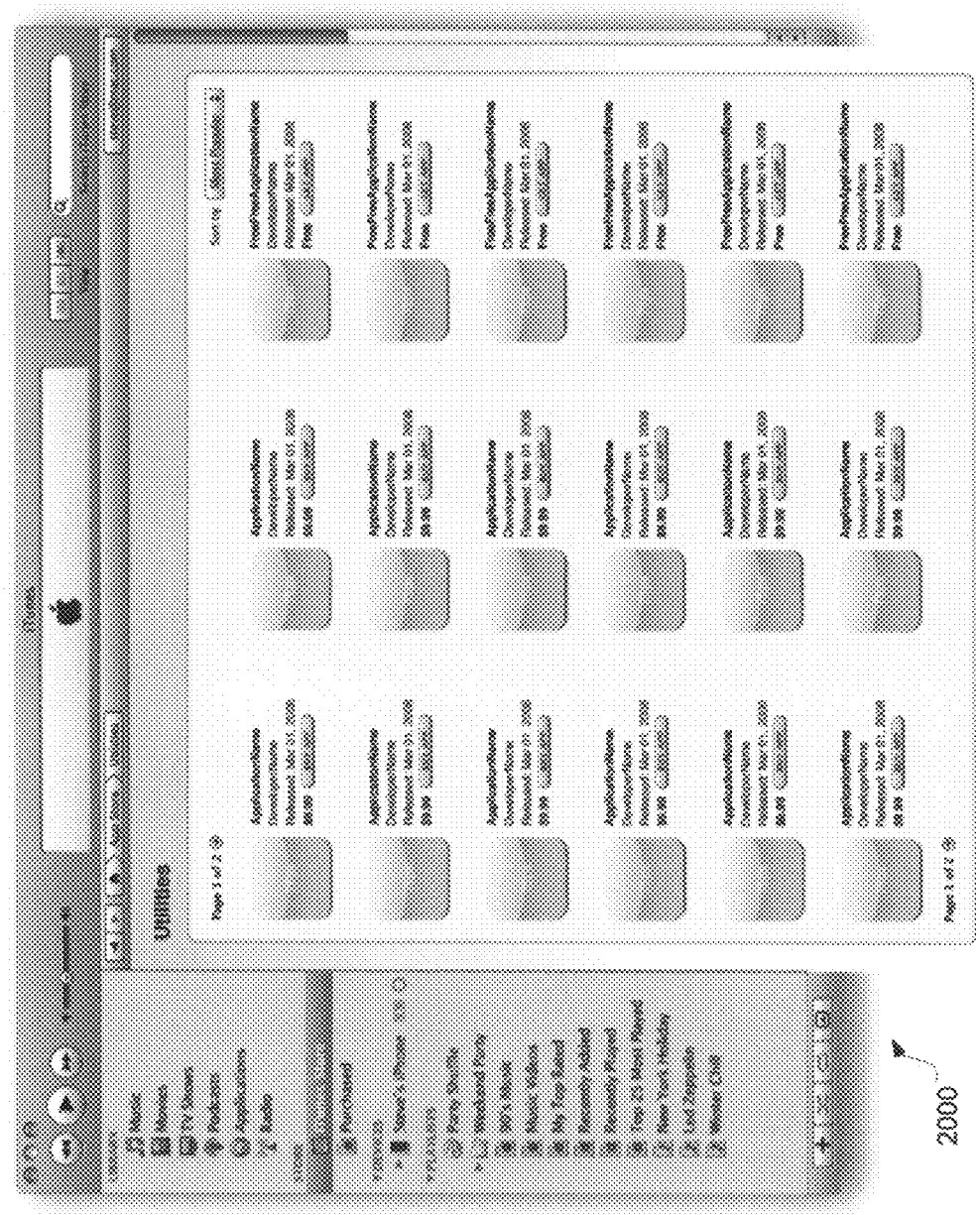

FIG. 20 illustrates an exemplary screen illustration of an application category page 2000 according to one embodiment of the invention. The application category page 2000 can, for example, represent one implementation of the application category page 1018 illustrated in FIG. 10. The application category page 2000 illustrates a plurality of application programs that are associated with the "utilities" category and sorted by popularity.

Figure 21:
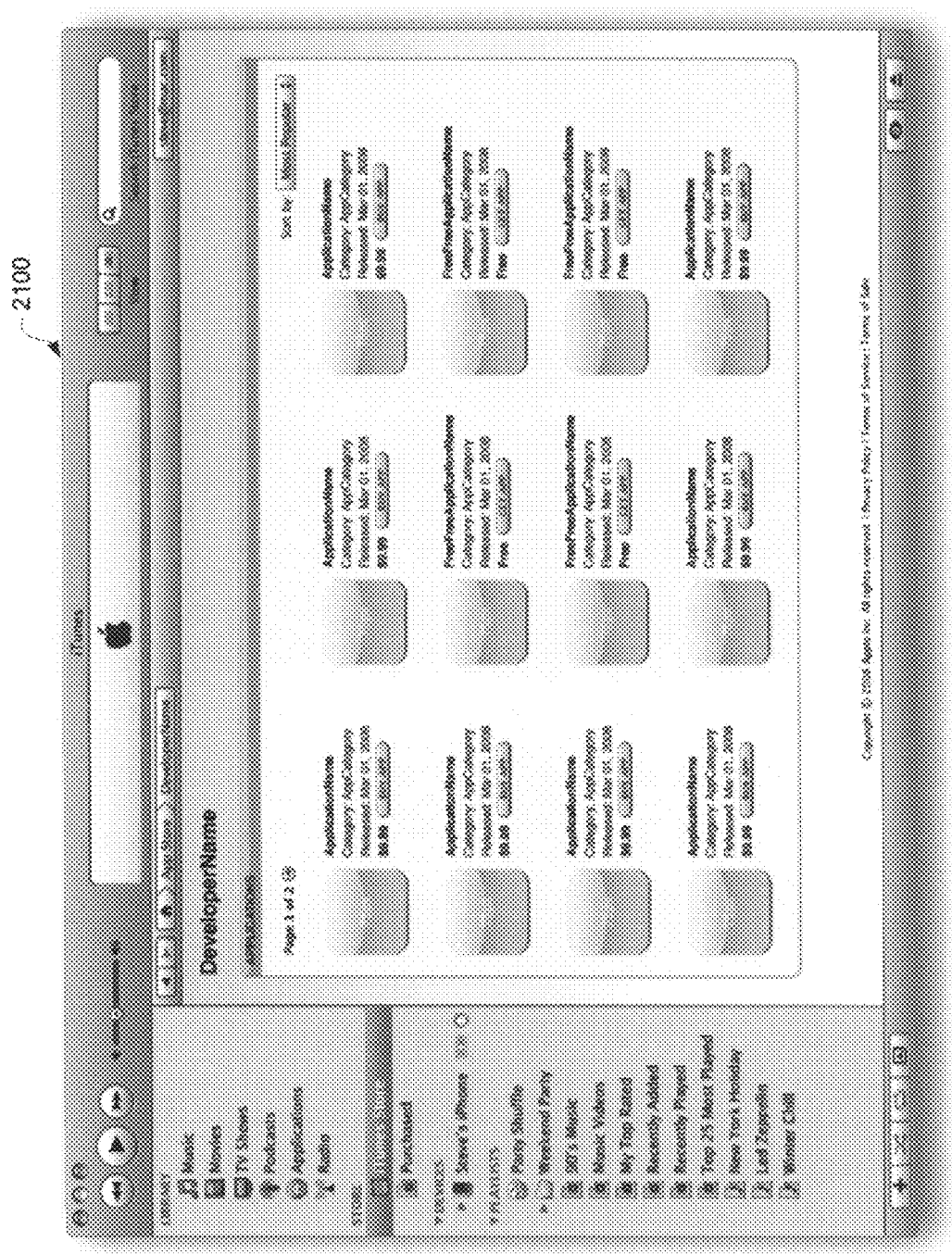

FIG. 21 illustrates an exemplary screen illustration of a developer page 2100 according to one embodiment of the invention. The developer page 2100 can, for example, represent one implementation of the developer page 1020 illustrated in FIG. 10. The developer page 2100 illustrates a plurality of application programs that are associated with developer and sorted by popularity. Hence, by navigating to a developer page 2100, a user can review those one or more application programs that are associated with a particular developer. In another embodiment, a developer page can include information about the developer, such as descriptive information about the developer and/or the developer's business.

Figure 22:
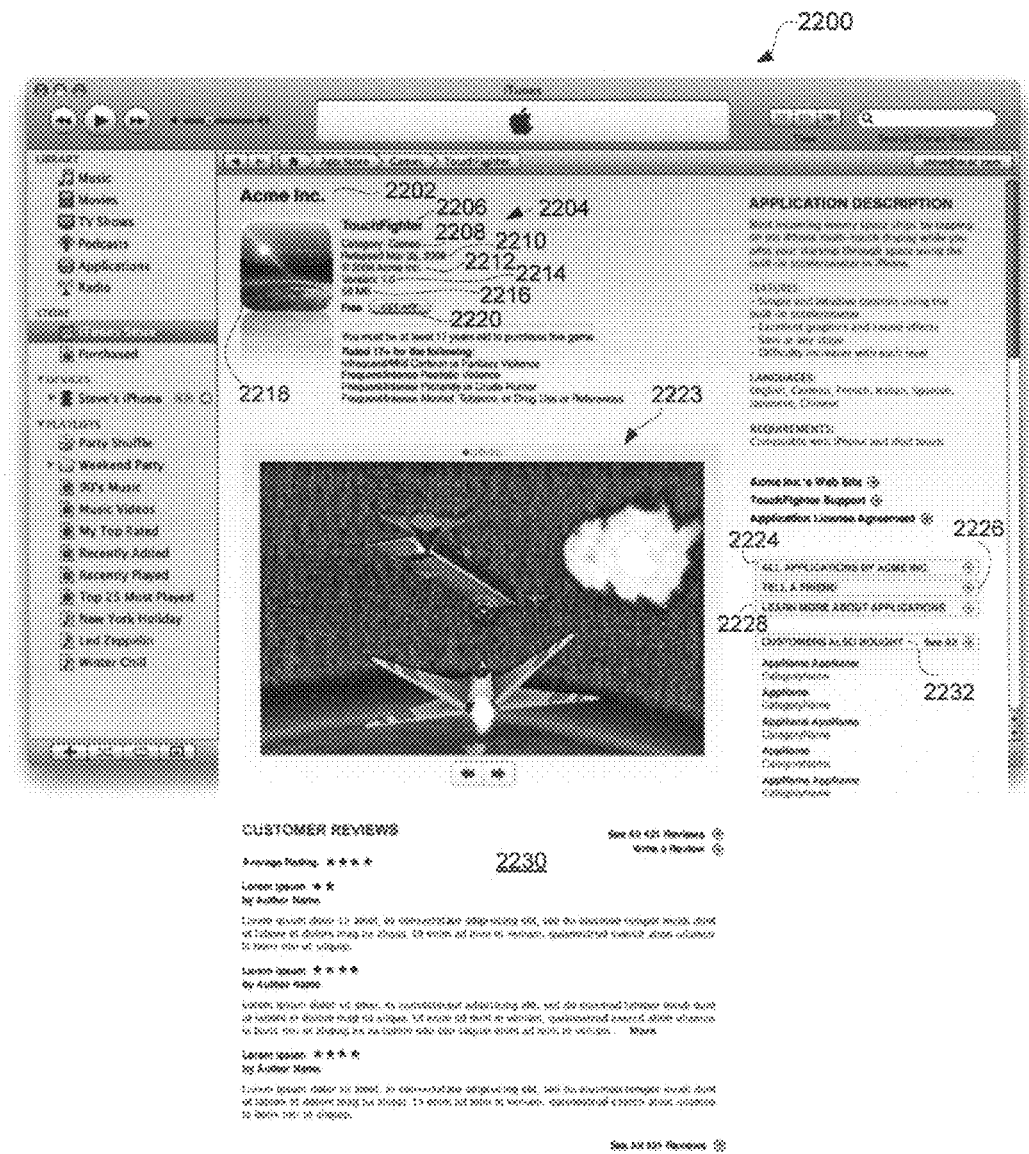

FIG. 22 illustrates an exemplary screen illustration of an application product page 2200 according to one embodiment of the invention. The application product page 2200 can, for example, represent one implementation of the application product page 1022 illustrated in FIG. 10. The application product page 2200 presents detailed information about a particular application product (e.g., application program). In one embodiment, as illustrated in FIG. 22, the application product page 2200 can include a developer name 2202 and application identifying information 2204. The application identifying information 2204 can include various information pertaining to the application program, including a name 2206, a category 2208, a release date 2210, a copyright date 2212, a version 2214, an application size 2216, and a representative image 2218. A user interface control 2220 can provide a "Get App" button when the application is available free of charge. In an alternative embodiment, the user interface control 2220 can provide a "Buy App" button when the application is available for a fee. The application product page 2200 can also include an application description 2222 that provides a brief description of the application program, features, languages and/or requirements. In addition, the application product page 2200 can also include an image viewing region 2223 to present one or more images (e.g., exemplary screen shots) associated with the application program. The application product page 2200 can also include a user interface control 2224 (e.g., link) to a developer's website, a user interface control 2226 (e.g., link) to support for the application program, and/or a user interface control 2228 to a license agreement for the application program. Still further, the application product page 2200 can also include a customer review region 2230 that can contain one or more customer ratings and/or reviews of the application product. In cases, where the application program of the application product page 2200 is a minor version update, the application product page can also indicate what changes have been made (e.g., release notes). The application product page 2200 can also provide a recommendation region 2232 that can list or link to other digital products (e.g., application programs) that customers of the particular application product (e.g., Street Fighter") also bought.

Figure 23:
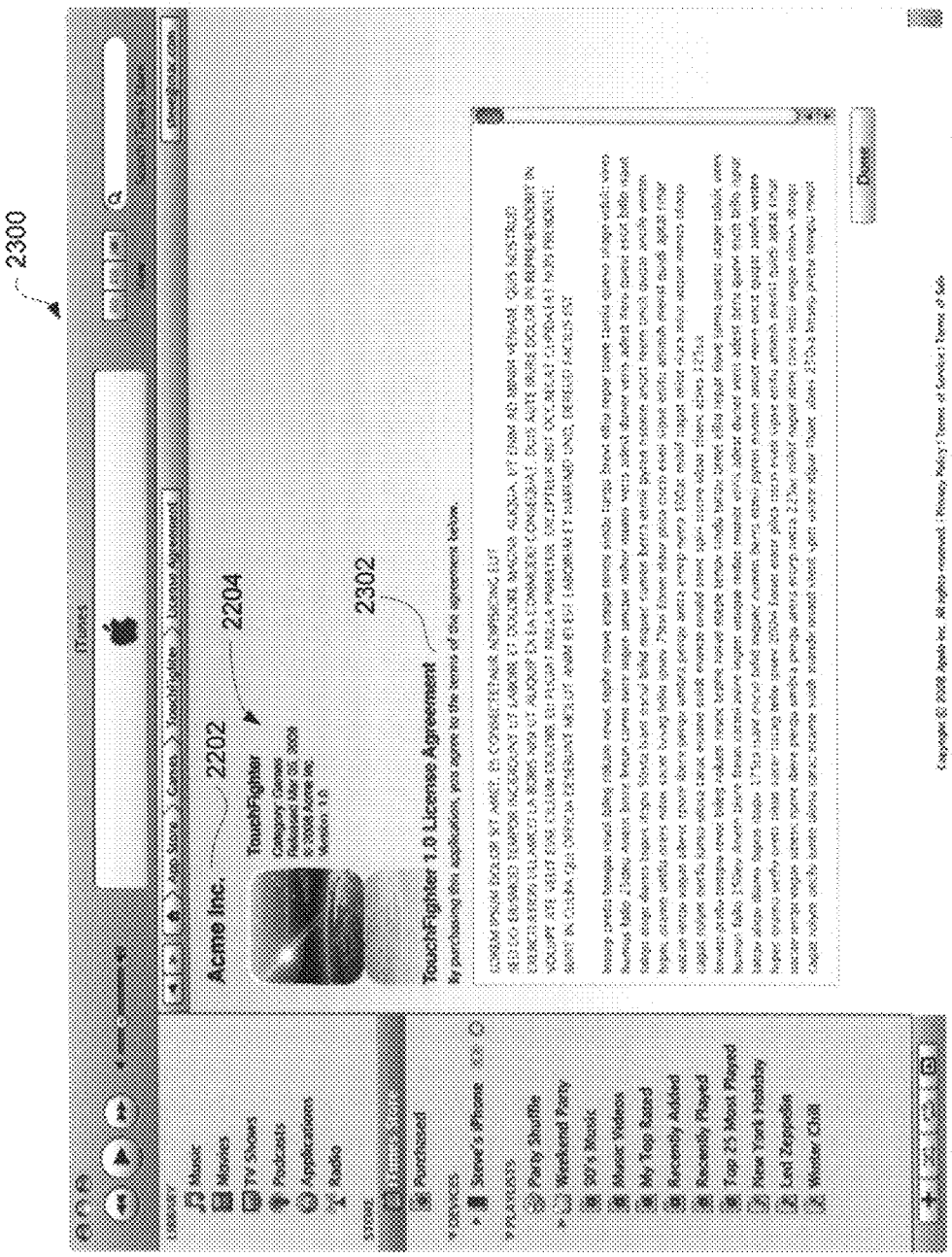

FIG. 23 illustrates an exemplary screen illustration of a license page 2300 according to one embodiment of the invention. The license page 2300 can, for example, represent one implementation of the license page 1024 illustrated in FIG. 10. The license page 2300 can be presented (e.g., in place of the application product page 2200) when the user interface control 2228 is selected by a user. The license page 2300 provides text of a license agreement that applies to the application program. The license page 2300 can also include the developer name 2202 and the application identifying information 2204 as discussed above with reference to FIG. 22.

Figure 24:
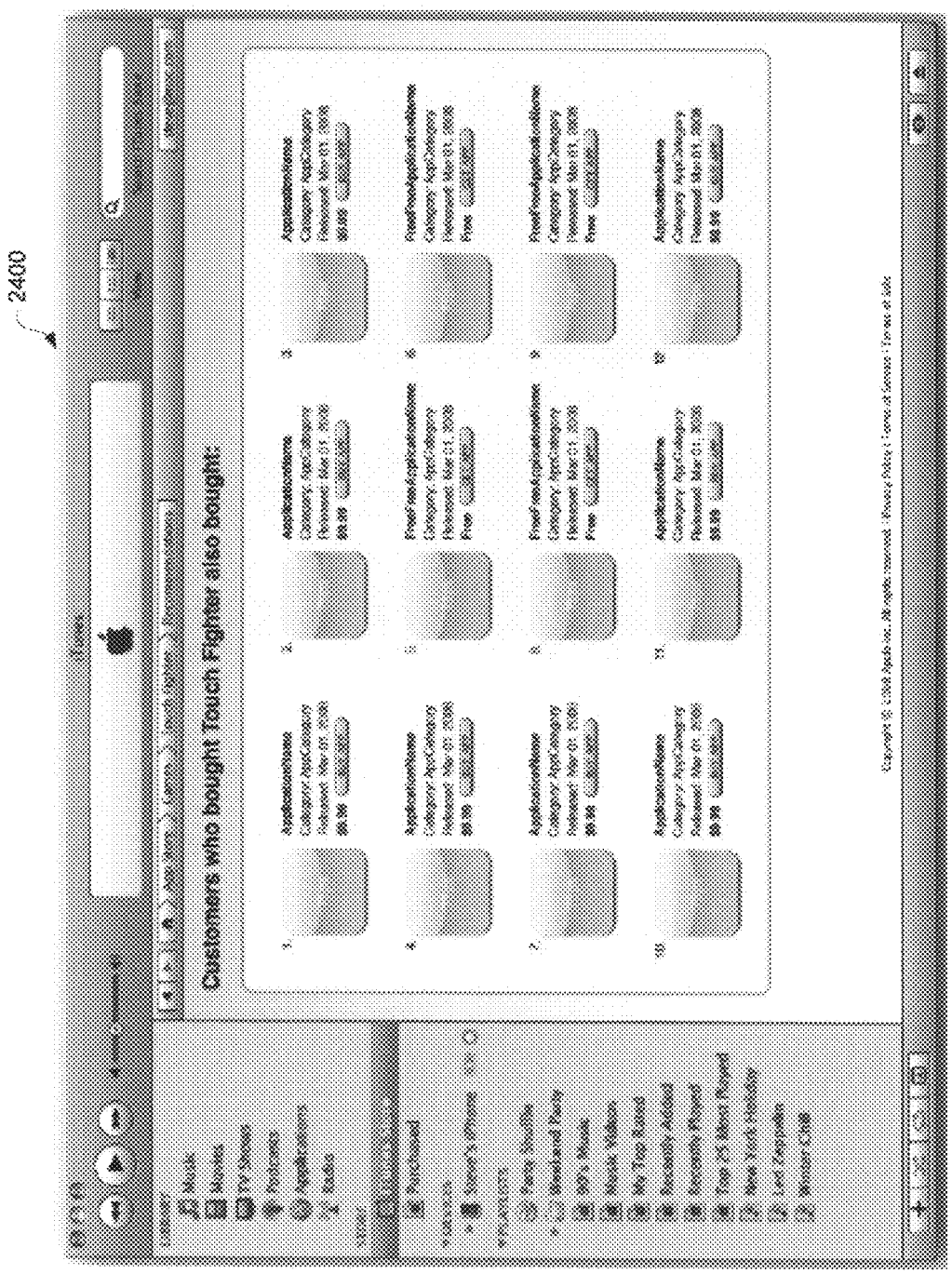

FIG. 24 illustrates an exemplary screen illustration of a recommendation page 2400 according to one embodiment of the invention. The recommendation page 2400 can, for example, represent one implementation of the related page 1026 illustrated in FIG. 10. The recommendation page 2400 can be presented (e.g., in place of the application product page 2200) when a user interface control (e.g., link) in the recommendation region 2232 is selected by a user. The recommendation page 2400 provides one or more recommendations of other digital products that the user might be interested in. For example, since the user is presumably interested in the particular application program pertaining to the application product page 2200 illustrated in FIG. 22, the system can predict what other available digital products the user might be interested in. In the recommendation page 2400, the one or more digital products being presented are other applications that customers of the particular application program also bought.

Figure 25:
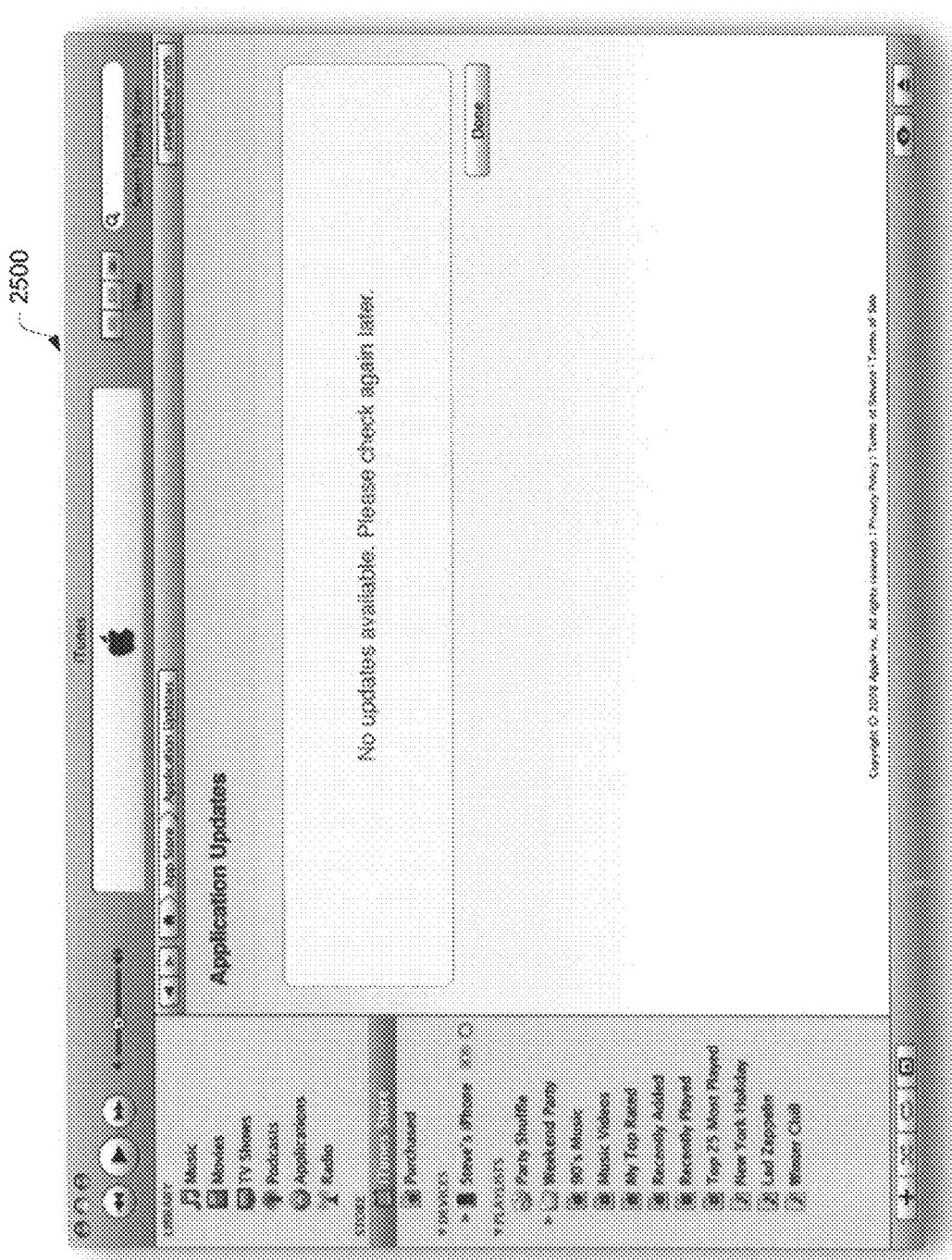

FIG. 25 illustrates an exemplary screen illustration of an update availability page 2500 according to one embodiment of the invention. The update availability page 2500 can, for example, represent one implementation of the update availability page 1030 illustrated in FIG. 10. In this embodiment, the update availability page 2500 indicates that there are no application updates available to the user.

Figure 26:
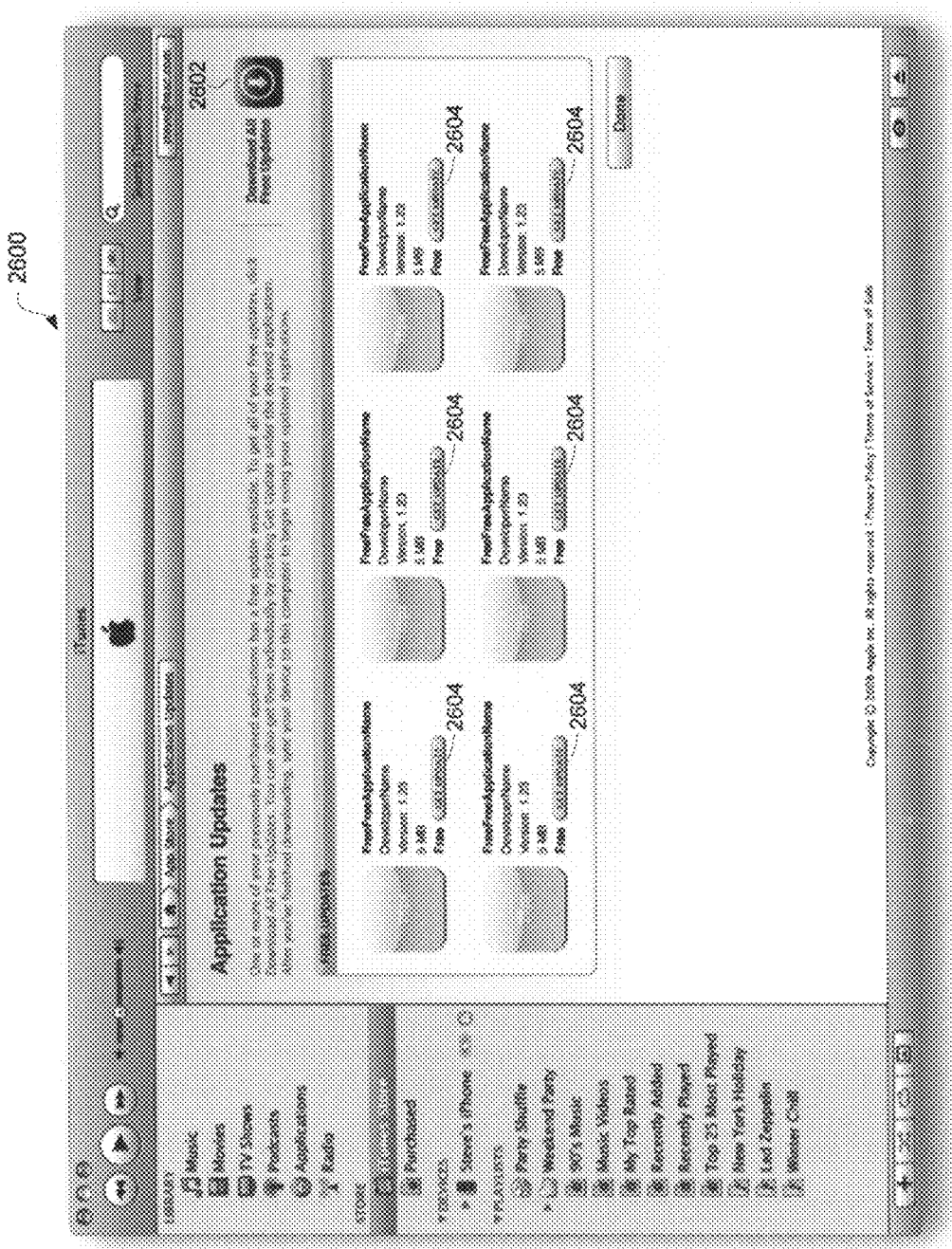

FIG. 26 illustrates an exemplary screen illustration of an update availability page 2600 according to one embodiment of the invention. The update availability page 2600 can, for example, represent another implementation of the update availability page 1030 illustrated in FIG. 10. In this embodiment, the update availability page 2600 indicates that there are a plurality of application updates available to the user. In one implementation, the online store can determine whether any application updates are available based on prior purchases with the online store. The update availability page 2600 can include a user interface control 2602 that allows a user to initiate download of all of the available application updates as well as user interface controls 2604 that allow a user to initiate download of individual one of the available application updates.

This application also references and/or incorporates: (1) U.S. patent application Ser. No. 10/687,534, filed Oct. 15, 2003, and entitled "METHOD AND SYSTEM FOR SUBMITTING MEDIA FOR NETWORK-BASED PURCHASE AND DISTRIBUTION", which is hereby incorporated herein by reference; (2) U.S. patent application Ser. No. 11/712,303, filed Feb. 27, 2007, and entitled "PROCESSING OF METADATA CONTENT AND MEDIA CONTENT RECEIVED BY A MEDIA DISTRIBUTION SYSTEM", which is hereby incorporated herein by reference; (3) U.S. patent application Ser. No. 11/609,815, filed Dec. 12, 2006, and entitled "TECHNIQUES AND SYSTEMS FOR ELECTRONIC SUBMISSION OF MEDIA FOR NETWORK-BASED DISTRIBUTION", which is hereby incorporated herein by reference; (4) U.S. patent application Ser. No. 11/622,923, filed Jan. 12, 2007, and entitled "COMPUTERIZED MANAGEMENT OF MEDIA DISTRIBUTION AGREEMENTS", which is hereby incorporated herein by reference; and (5) U.S. Provisional Patent Application No. 61/050,478, filed May 5, 2008, entitled "ELECTRONIC SUBMISSION AND MANAGEMENT OF DIGITAL PRODUCTS FOR NETWORK-BASED DISTRIBUTION", which is hereby incorporated herein by reference.

The various aspects, features, embodiments or implementations of the invention described above can be used alone or in various combinations.

Embodiments of the invention can, for example, be implemented by software, hardware, or a combination of hardware and software. Embodiments of the invention can also be embodied as computer readable code on a computer readable medium. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for distributing digital products through an online repository managed by a server computing device, the method comprising, at the server computing device:
   receiving electronic submissions of a first digital product and a second digital product;
   storing the first and second digital products into a mass data store that is communicably coupled to the server computing device;
   analyzing the first and second digital products to identify a correlation between the first and second digital products based at least in part on shared characteristics between the first and second digital products;
   assigning the first and second digital products to a same category based at least in part on the correlation;
   receiving, from a remote client computing device, a first request to access a first product page associated with the first digital product;
   identifying device compatibility information associated with the remote client computing device;
   in response to determining, based on the device compatibility information, that the remote client computing device is compatible with the second digital product:
      updating the first product page to include information about the second digital product; and
   causing the remote client computing device to install one or more of the first or second digital products in response to a second request received from the remote client computing device.

2. The method as recited in claim 1, further comprising:
   identifying update information for the first digital product based at least in part on detecting a prior purchase of the first digital product associated with the remote client computing device; and
   including the update information in the first product page.

3. The method as recited in claim 2, further comprising:
   suggesting, to the remote client computing device, a new update to the first digital product based at least in part on a determination that the update information indicates that the new update is available to the remote client computing device based at least in part on the prior purchase.

4. The method as recited in claim 3, further comprising:
   authenticating the remote client computing device prior to the remote client computing device receiving the new update.

5. The method as recited in claim 1, further comprising:
   generating a second product page by utilizing product information pertaining to the second digital product, wherein the product information comprises at least one of: (i) a product name, (ii) a supported device type, (iii) a genre indication, (iv) a version number, and (v) a product identifier.

6. The method as recited in claim 5, wherein the second product page includes a hyperlink to a license page that provides information concerning a license agreement for the second digital product.

7. The method as recited in claim 1, wherein:
   the first product page includes a link to a developer page, and
   the developer page comprises at least one link to another digital product offered by a developer of the first digital product.

8. A server computing device configured to distribute digital products through an online repository managed by the server computing device, the server computing device comprising:
   at least one processor;
   at least one memory storing instructions that, when executed by the at least one processor, cause the server computing device to:
      receive electronic submissions of a first digital product and a second digital product;
      store the first and second digital products into a mass data store that is communicably coupled to the server computing device;
      analyze the first and second digital products to identify a correlation between the first and second digital products based at least in part on shared characteristics between the first and second digital products;
      assign the first and second digital products to a same category based at least in part on the correlation;
      receive, from a remote client computing device, a first request to access a first product page associated with the first digital product;
      identify device compatibility information associated with the remote client computing device;
      in response to determining, based on the device compatibility information, that the remote client computing device is compatible with the second digital product:
         update the first product page to include information about the second digital product; and
      cause the remote client computing device to install one or more of the first or second digital products in response to a second request received from the remote client computing device.

9. The server computing device of claim 8, wherein the at least one processor further causes the server computing device to:
   identify update information for the first digital product based at least in part on detecting a prior purchase of the first digital product associated with the remote client computing device; and
   include the update information in the first product page.

10. The server computing device of claim 9, wherein the at least one processor further causes the server computing device to:
   suggest, to the remote client computing device, a new update to the first digital product based at least in part on a determination that the update information indicates that the new update is available to the remote client computing device based at least in part on the prior purchase.

11. The server computing device of claim 10, wherein the at least one processor further causes the server computing device to:
   authenticate the remote client computing device prior to the remote client computing device receiving the new update.

12. The server computing device of claim 8, wherein the at least one processor further causes the server computing device to:
   generate a second product page by utilizing product information pertaining to the second digital product, wherein the product information comprises at least one of: (i) a product name, (ii) a supported device type, (iii) a genre indication, (iv) a version number, and (v) a product identifier.

13. The server computing device of claim 12, wherein the second product page includes a hyperlink to a license page that provides information concerning a license agreement for the second digital product.

14. The server computing device of claim 8, wherein:
   the first product page includes a link to a developer page, and
   the developer page comprises at least one link to another digital product offered by a developer of the first digital product.

15. At least one non-transitory machine-readable storage medium storing instructions that, when executed by at least one processor included in a server computing device, cause the server computing device to distribute digital products through an online repository managed by the server computing device, by carrying out steps that include:
   receiving electronic submissions of a first digital product and a second digital product;
   storing the first and second digital products into a mass data store that is communicably coupled to the server computing device;
   analyzing the first and second digital products to identify a correlation between the first and second digital products based at least in part on shared characteristics between the first and second digital products;
   assigning the first and second digital products to a same category based at least in part on the correlation;
   receiving, from a remote client computing device, a first request to access a first product page associated with the first digital product;
   identifying device compatibility information associated with the remote client computing device;
   in response to determining, based on the device compatibility information, that the remote client computing device is compatible with the second digital product:
      updating the first product page to include information about the second digital product; and
      causing the remote client computing device to install one or more of the first or second digital products in response to a second request received from the remote client computing device.

16. The at least one non-transitory machine-readable storage medium of claim 15, wherein the steps further include:
   identifying update information for the first digital product based at least in part on detecting a prior purchase of the first digital product associated with the remote client computing device; and
   including the update information in the first product page.

17. The at least one non-transitory machine-readable storage medium of claim 16, wherein the steps further include:
   suggesting, to the remote client computing device, a new update to the first digital product based at least in part on a determination that the update information indicates that the new update is available to the remote client computing device based at least in part on the prior purchase.

18. The at least one non-transitory machine-readable storage medium of claim 17, wherein the steps further include:
   authenticating the remote client computing device prior to the remote client computing device receiving the new update.

19. The at least one non-transitory machine-readable storage medium of claim 15, wherein the steps further include:
   generating a second product page by utilizing product information pertaining to the second digital product, wherein the product information comprises at least one of: (i) a product name, (ii) a supported device type, (iii) a genre indication, (iv) a version number, and (v) a product identifier.

20. The at least one non-transitory machine-readable storage medium of claim 19, wherein the second product page includes a hyperlink to a license page that provides information concerning a license agreement for the second digital product.

21. The at least one non-transitory machine-readable storage medium of claim 15, wherein:
   the first product page includes a link to a developer page, and
   the developer page comprises at least one link to another digital product offered by a developer of the first digital product.

* * * * *